United States Patent
Jonson et al.

(10) Patent No.: US 12,128,726 B2
(45) Date of Patent: Oct. 29, 2024

(54) REAR DAMPER ADJUSTMENT

(71) Applicant: Volvo Car Corporation, Gothenburg (SE)

(72) Inventors: Axel Jonson, Gothenburg (SE); Anton Albinsson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 856 days.

(21) Appl. No.: 17/161,373

(22) Filed: Jan. 28, 2021

(65) Prior Publication Data

US 2022/0234410 A1    Jul. 28, 2022

(51) Int. Cl.
*B60G 17/0165*   (2006.01)
*B60G 17/018*    (2006.01)

(52) U.S. Cl.
CPC ....... *B60G 17/0165* (2013.01); *B60G 17/018* (2013.01); *B60G 2400/821* (2013.01); *B60G 2400/92* (2013.01); *B60G 2600/1876* (2013.01)

(58) Field of Classification Search
None
See application file for complete search history.

(56) References Cited

U.S. PATENT DOCUMENTS

| | | |
|---|---|---|
| 4,887,699 A | 12/1989 | Ivers et al. |
| 5,361,209 A | 11/1994 | Tsutsumi |
| 5,446,663 A | 8/1995 | Sasaki |

(Continued)

FOREIGN PATENT DOCUMENTS

| | | |
|---|---|---|
| CN | 109715421 A | 5/2019 |
| CN | 105313627 B | 8/2019 |

(Continued)

OTHER PUBLICATIONS

Non-Final Office Action received for U.S. Appl. No. 17/161,347, dated Oct. 10, 2023, 42 pages.

(Continued)

*Primary Examiner* — Lail A Kleinman
(74) *Attorney, Agent, or Firm* — Amin, Turocy & Watson, LLP

(57) ABSTRACT

Systems, computer-implemented methods, and computer program products relating to jerk of a vehicle damper are provided. According to an embodiment, a system can comprise a memory that stores computer executable components and a processor that executes the computer executable components stored in the memory. The computer executable components can comprise a control signal determination component that determines movement of a front damper of a vehicle, an amount of time between a first time when the movement of the front damper occurs and a second time when a rear damper of the vehicle will experience a condition which caused the movement of the front damper, and a front damping coefficient of the front damper, and determines a rear damping coefficient of the rear damper configured to mitigate rear suspension impact with an end stop caused by rear suspension compression or rebound based on the movement of the front damper, the amount of time, and the front damping coefficient, and a damper adjustment component that adjusts the rear damper to the rear damping coefficient.

20 Claims, 18 Drawing Sheets

(56) References Cited

U.S. PATENT DOCUMENTS

| | | | |
|---|---|---|---|
| 5,490,068 | A | 2/1996 | Shimizu et al. |
| 5,701,246 | A | 12/1997 | Uchiyama |
| 6,155,391 | A | 12/2000 | Kashiwagi et al. |
| 6,698,780 | B2 | 3/2004 | Miyoshi |
| 8,296,009 | B2 | 10/2012 | Kajino |
| 8,903,619 | B2 | 12/2014 | Noumura et al. |
| 8,996,249 | B2 | 3/2015 | Lu et al. |
| 9,027,937 | B2 | 5/2015 | Ryan et al. |
| 9,527,364 | B2 | 12/2016 | Mohamed et al. |
| 9,662,954 | B2 | 5/2017 | Brady et al. |
| 9,809,076 | B2 | 11/2017 | Hirao |
| 9,840,118 | B2 | 12/2017 | Singh |
| 10,343,477 | B2 | 7/2019 | Yamashita et al. |
| 11,104,198 | B2 | 8/2021 | Yamahata et al. |
| 2009/0030574 | A1* | 1/2009 | Yamakado ............ B60W 50/16 701/44 |
| 2014/0058606 | A1* | 2/2014 | Hilton ..................... B60L 15/20 701/22 |
| 2015/0006027 | A1* | 1/2015 | Maurer ..................... B60S 9/02 701/36 |
| 2016/0031284 | A1 | 2/2016 | Yamashita et al. |
| 2016/0040742 | A1 | 2/2016 | Yamashita et al. |
| 2017/0166019 | A1 | 6/2017 | Singh |
| 2017/0326936 | A1* | 11/2017 | Saito ................ B60G 17/0161 |
| 2020/0139782 | A1 | 5/2020 | Goto et al. |
| 2020/0406699 | A1 | 12/2020 | Yamahata et al. |
| 2021/0110716 | A1* | 4/2021 | Becker ................ G05D 1/0223 |
| 2021/0379953 | A1* | 12/2021 | Furuta ................ B60G 17/0165 |
| 2022/0055629 | A1* | 2/2022 | Schumann ............ B60W 10/18 |
| 2022/0234408 | A1 | 7/2022 | Jonson et al. |
| 2022/0234410 | A1 | 7/2022 | Jonson et al. |
| 2022/0242417 | A1* | 8/2022 | Berger ............. B60W 50/0098 |
| 2023/0100858 | A1* | 3/2023 | Hirao .................. B60G 17/018 280/5.515 |

FOREIGN PATENT DOCUMENTS

| | | |
|---|---|---|
| CN | 110654195 | 1/2020 |
| CN | 109715421 B | 5/2022 |
| DE | 42 42 790 A1 | 7/1993 |
| DE | 42 32 221 C2 | 3/1995 |
| DE | 40 39 003 C2 | 3/1996 |
| DE | 40 42 573 C2 | 8/1996 |
| DE | 197 05 562 A1 | 8/1997 |
| DE | 42 25 219 C2 | 6/1998 |
| DE | 42 42 790 C2 | 12/1998 |
| DE | 197 05 562 C2 | 1/2001 |
| DE | 10 2015 214 343 A1 | 2/2016 |
| DE | 11-2018 007 386 T5 | 12/2020 |
| EP | 3 178 674 A1 | 6/2017 |
| EP | 3 178 674 B1 | 9/2018 |
| GB | 2 239 506 B | 8/1993 |
| JP | 3083114 B2 | 9/2000 |
| JP | 2001-047833 A | 2/2001 |
| JP | 2002-114017 A | 4/2002 |
| JP | 3608445 B2 | 1/2005 |
| JP | 4747436 B2 | 8/2011 |
| JP | 2015-058914 A | 3/2015 |
| JP | 5842935 B2 | 1/2016 |
| JP | 2016-032990 A | 3/2016 |
| JP | 6259944 B1 | 1/2018 |
| JP | 6324254 B2 | 5/2018 |
| JP | 2019-031240 A | 2/2019 |
| JP | 6810828 B2 | 1/2021 |
| RU | 2 700 290 C2 | 9/2019 |
| WO | 2013/111742 A1 | 8/2013 |
| WO | 2018/016540 A1 | 1/2018 |
| WO | 2019/008902 A1 | 1/2019 |
| WO | 2019/187224 A1 | 10/2019 |
| WO | 2022/255455 A1 | 12/2022 |
| WO | 2023/054038 A1 | 4/2023 |

OTHER PUBLICATIONS

Notice of Allowance received for U.S. Appl. No. 17/161,347 dated Feb. 5, 2024, 56 pages.

* cited by examiner

REAR DAMPER ADJUSTMENT

BACKGROUND

One or more embodiments herein relate to adjusting a rear vehicle damper, and specifically, to determining and providing a damping coefficient of a rear damper based on movement of a front damper.

SUMMARY

The following presents a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that limit vehicle damper jerk are described.

Conventionally, vehicle damping systems adjust between various damping coefficients. Changes to such damping coefficients can be responsive to road conditions. However, such responses are typically made across a group of dampers (e.g., applied to a group of dampers collectively). Conventional responses, however, miss an opportunity to appropriately set a rear damping coefficient of a rear damper based on a condition experienced by a front axle or damper. Furthermore, such conventional systems can allow a rear damper or associated suspension to "bottom out" (e.g., fully compress) or experience a hard impact with an end stop or bump stop. This can cause passenger discomfort in a vehicle. Therefore, there exists a need to improve vehicle damping systems such that rear damping coefficients can be determined based on conditions experienced by a front axle or damper.

According to an embodiment, a computer-implemented method can comprise determining, by a controller operatively coupled to a processor, movement of a front damper of a vehicle, an amount of time between a first time when the movement of the front damper occurs and a second time when a rear damper of the vehicle will experience a condition which caused the movement of the front damper, and a front damping coefficient of the front damper, and determining, by the controller, a rear damping coefficient of the rear damper configured to prevent rear suspension impact with an end stop caused by rear suspension compression or rebound based on the movement of the front damper, the amount of time, and the front damping coefficient.

According to another embodiment, a system can comprise a memory that stores computer executable components and a processor that executes the computer executable components stored in the memory. The computer executable components can comprise a control signal determination component that determines movement of a front damper of a vehicle, an amount of time between a first time when the movement of the front damper occurs and a second time when a rear damper of the vehicle will experience a condition which caused the movement of the front damper, and a front damping coefficient of the front damper, and determines a rear damping coefficient of the rear damper configured to mitigate rear suspension impact with an end stop caused by rear suspension compression or rebound based on the movement of the front damper, the amount of time, and the front damping coefficient, and a damper adjustment component that adjusts the rear damper to the rear damping coefficient.

According to another embodiment, a computer program product facilitating damper control is provided. The computer program product comprising a computer readable storage medium having program instructions embodied therewith, the program instructions executable by a processor to cause the processor to determine, the processor, movement of a front damper of a vehicle, an amount of time between a first time when the movement of the front damper occurs and a second time when a rear damper of the vehicle will experience a condition which caused the movement of the front damper, and a front damping coefficient of the front damper, determine, by the processor, a rear damping coefficient of the rear damper configured to mitigate rear suspension impact with an end stop caused by rear suspension compression or rebound based on the movement of the front damper, the amount of time, and the front damping coefficient.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It will be understood that when an element is referred to as being "coupled" to another element, it can describe one or more different types of coupling including, but not limited to, chemical coupling, communicative coupling, capacitive coupling, electrical coupling, electromagnetic coupling, inductive coupling, operative coupling, optical coupling, physical coupling, thermal coupling, and/or another type of coupling. As referenced herein, an "entity" can comprise a human, a client, a user, a computing device, a software application, an agent, a machine learning model, an artificial intelligence, and/or another entity. It should be appreciated that such an entity can facilitate implementation of the subject disclosure in accordance with one or more embodiments the described herein.

Figure 1:
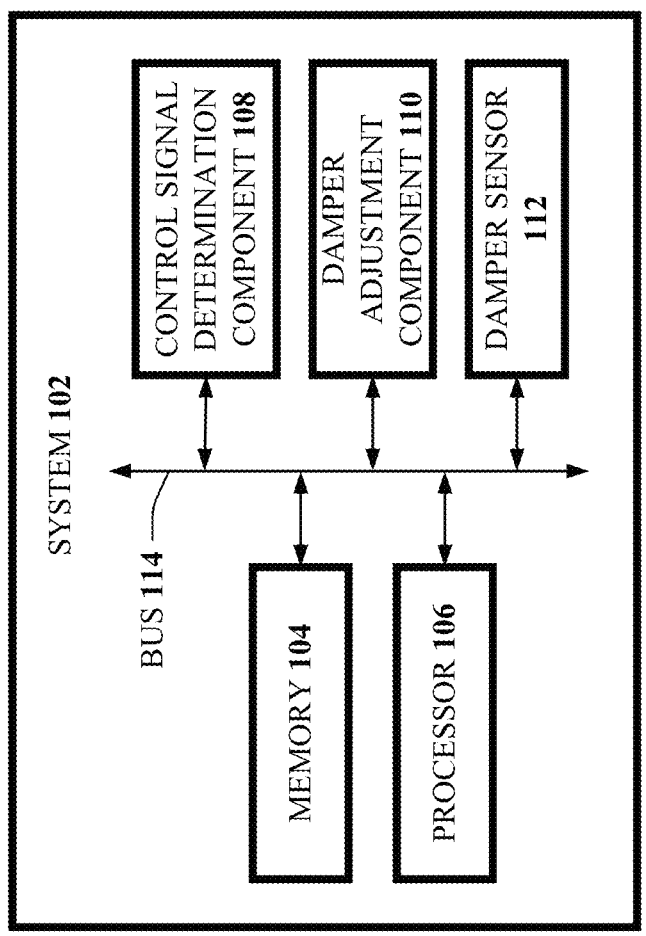
FIG. 1 illustrates a block diagram of an example, non-limiting system that can control a vehicle damper in accordance with one or more embodiments described herein.

FIG. 1 illustrates a block diagram of an example, non-limiting system 102 in accordance with one or more embodiments described herein. System 102 can comprise a memory 104, a processor 106, a control signal determination component 108, a damper adjustment component 110, a damper sensor 112, and/or a bus 114. In various embodiments, one or more of the memory 104, processor 106, control signal determination component 108, damper adjustment component 110, damper sensor 112, and/or a bus 114 can be communicatively or operably coupled to one another to perform one or more functions of the system 102.

System 102 can facilitate (e.g., via processor 106) performance of operations executed by and/or associated with control signal determination component 108, damper adjustment component 110, damper sensor 112, or other components which will be later discussed in greater detail, (e.g., body movement sensor 204, temperature sensor 304, road condition component 404, user preference component 504, communication component 604, and/or artificial intelligence component 704).

Control signal determination component 108 can determine damping coefficients and rates of change from current damping coefficients to new or target damping coefficients (e.g., levels of damping) to limit jerk of a damper based on a movement signal of the damper (e.g., a damper 804). Such new or target damping coefficients can be based on road conditions or user preferences. Such movement can be determined by a sensor (e.g., a damper sensor 112) which can be a component of an associated damper or can be external to the damper.

According to an embodiment, a sensor or group of sensors (e.g., damper sensor 112) can comprise a damper movement sensor and/or a damper position sensor (e.g., position sensor 808) which will be later discussed in greater detail. Unlimited rate of change of damper adjustment (e.g., for an adjustable damper such as a damper 804, caused by a damper adjustment component 110) can cause a high level of jerk, which can lead to passenger discomfort. Therefore, the control signal determination component 108 can determine a rate of change for damper adjustment (e.g., from a current damping coefficient to a new or a target damping coefficient) which prevents an uncomfortable jerk in a vehicle suspension by accessing information from a damper movement sensor and/or damper position sensor and to determine an appropriate rate of change. Such rates of change can be according to predefined thresholds for acceptable rates of change based upon current velocity and/or acceleration of a damper, current or instant damping coefficients, new or target damping coefficients, and/or a difference between a current damping coefficient and a target damping coefficient. Damper adjustment can comprise changes to damper firmness (e.g., for an adaptive suspension) or to a combination of parameters for an active suspension, such as an amount of damper extension, firmness, or other suitable parameters. Rate of change limits can, for instance, be implemented using look-up tables and/or gains based upon the relevant signals or by equation(s) based on the input signals. Output of the look-up table or equation can vary for different types of actuators and embodiments. According to an example, outputs can include, but are not limited to, a force gradient limit, a current gradient limit, and/or pressure gradient limit. With look-up tables, the rate of change of the control signal can be set explicitly. Rate of change limits can also be implemented by direct optimal control in which a penalty is set to the rate of change of the level of damping in each time step. With a direct optimal control problem, the rate of change is set implicitly by penalizing the change of the control signal. The control signal determination component 108 can utilize damper velocity/acceleration (e.g., speed of travel or speed of compression or rebound), wheel velocity (e.g., linear or rotational), vehicle body acceleration, body vehicle body velocity, and/or other suitable variables to determine parameters for a damper and/or a rate at which to adjust to them. In this regard, a limit of a gradient of damper acceleration can be determined by a control signal determination component 108 in order to limit jerk of a damper so that a jerk is not noticeable to an occupant of a vehicle. It can be appreciated that a rate of change of damping adjustment can be determined by a control signal determination component 108 for one or more of a damper of a vehicle, independently or collectively.

According to an embodiment, an acceptable amount of jerk (e.g., an amount of jerk below a threshold jerk limit) can be predefined or can be variable. For instance, a defined rate of change of a level of damping can be based on a vehicle make, model, or sub-model. Other embodiments can vary jerk limits based on a driving mode of an associated vehicle. Such threshold jerk limits can be predefined and stored in a memory (e.g., memory 104) or can be user defined or modified. For instance, a vehicle in a comfort mode may limit jerk more significantly than the same vehicle in a sport mode (e.g., intended for more spirited driving than driving in a comfort mode). A lookup table can be utilized which can comprise different values for positive and negative rates of change, or to/from a set-point. In other examples, rate of change can be set implicitly by penalizing the change of the control signal (e.g., using direct optimal control such as model predictive control).

A damper adjustment component 110 can cause a damper to adjust to one or more specified parameters (e.g., a damping coefficient or ratio) at a rate (e.g., as determined by the control signal determination component 108) which does not cause a damper to exceed a defined amount of jerk. The damper adjustment component 110 can send a control signal to one or more dampers of an associated vehicle. This control signal can comprise a limited rate of change for adjustment of the damper.

It can be appreciated that the damper sensor 112 can sense/determine a damper position or damper movement, such as damper velocity, damper acceleration, or damper jerk. The damper sensor 112 can send a signal comprising position or movement information of a damper to the system 102 (e.g., over a bus 114), which can enable the control signal determination component 108 to determine a control signal to send to a damper by the damper adjustment component 110.

According to a nonlimiting example, at a low damper velocity, a large force gradient (e.g., jerk) can occur. Stated otherwise, transitioning from zero damper velocity to a high damper velocity can, at least at the beginning of the transition, possess a large force gradient. Therefore, a rate of change of a damping coefficient or ratio (e.g., control signal) can be based on damper velocity (e.g., as detected by a damper sensor 112). When damper acceleration is large, a low maximum force gradient can be permitted by the control signal determination component 108. The rate of change of acceleration can be manipulated such that a large jerk does not occur in the damper at low damper velocities (or other velocities)

System 102 (and other systems described herein such as systems 202, 302, 402, 502, 602, 702, and/or 802) is applicable to both semi-active and active damper technology. For semi-active dampers, the rate of change of level of damping can be controlled, such as by limiting the gradient of the controlling current. For active dampers, a force gradient limit can be applied to the force request to the active damper actuator, or in the lower level of control of a corresponding actuator.

It should be appreciated that the system 102 (e.g., via control signal determination component 108) can prevent full compression of a damper. In this regard, a vehicle suspension can be prevented from "bottoming out".

In additional embodiments, movement of occupant(s) of a vehicle can be determined (e.g., via a vehicle cabin camera, seat sensor, or other suitable sensor). The system 102 (e.g., via control signal determination component) can account for occupant movement when determining the rate of change for damper adjustment. In this regard, an occupant sensor (e.g., a pressure sensor located within a seat) can determine an instantaneous force against a seat caused by an occupant. According to an example, a vehicle occupant may reach from a front passenger seat to a rear seat to retrieve an item. During this retrieval, the occupant can alter the center of mass of a corresponding vehicle, and/or the occupant may jostle or bounce from the seat during the retrieval maneuver.

The system 102 can utilize the determined occupant movement (e.g., instantaneous force applied by an occupant to a seat of a vehicle and transmitted to the vehicle) when determining the rate of change for damper adjustment to ensure jerk is still limited despite the occupant movement. It can therefore be appreciated that damper adjustment (e.g., target damper coefficient and/or rate of damper adjustment) as determined by the control signal determination component 108 and facilitated by the damper adjustment component 110 can be based on part on the occupant movement. In this regard, a rate of change formula or lookup table can include force corresponding to movement of an occupant of a vehicle. In this regard, occupant size and/or location in a vehicle can be accommodated. For instance, a mass of a vehicle body above each wheel can change depending on the loading conditions and the driver/passenger positions. A real-time estimation of static vertical load on each of the corners can be utilized to adapt the rate of change limit. This can normalize the jerk level experienced by the driver/passenger for different loading conditions.

In some embodiments, system 102 (and/or other systems described herein) can be implemented in an onboard computing and/or communication system that can be located in a vehicle (e.g., a car, truck, SUV, semi-trailer truck, van, aircraft, boat, or any other vehicle that comprises an adjustable damping system). In these embodiments, systems herein can be coupled (e.g., communicatively, electrically, operatively, optically, etc.) to one or more electronic control units (ECU) in the vehicle (e.g., via a controller area network (CAN bus)). For example, a system described herein can be implemented in an onboard computing and/or communication system located in a vehicle and coupled to one or more electronic control units in the vehicle to facilitate various operations of such electronic control unit(s) based on one or more commands (e.g., instruction(s)) provided to a system described herein.

Memory 104 can store one or more computer/machine readable and/or executable components and/or instructions that, when executed by processor 106 (e.g., a classical processor, a quantum processor, etc.), can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to system 102, control signal determination component 108, damper adjustment component 110, damper sensor 112, or other components which will be later discussed in greater detail, such as body movement sensor 204, temperature sensor 304, road condition component 404, user preference component 504, communication component 604, and/or artificial intelligence component 704. Memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures.

Processor 106 can comprise one or more types of processors and/or electronic circuitry (e.g., a classical processor, a quantum processor, etc.) that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, quantum processor, and/or another type of processor.

Bus 114 can comprise one or more memory bus, memory controller, peripheral bus, external bus, local bus, a quantum bus, and/or another type of bus that can employ various bus architectures (e.g., industrial standard architecture (ISA), extended ISA (EISA), micro-channel architecture (MSA), intelligent drive electronics (IDE), advanced graphics port (AGP), VESA local bus (VLB), peripheral component interconnect (PCI), universal serial bus (USB), card bus, small computer systems interface (SCSI), firewire (IEEE 1394), etc.).

Figure 2:
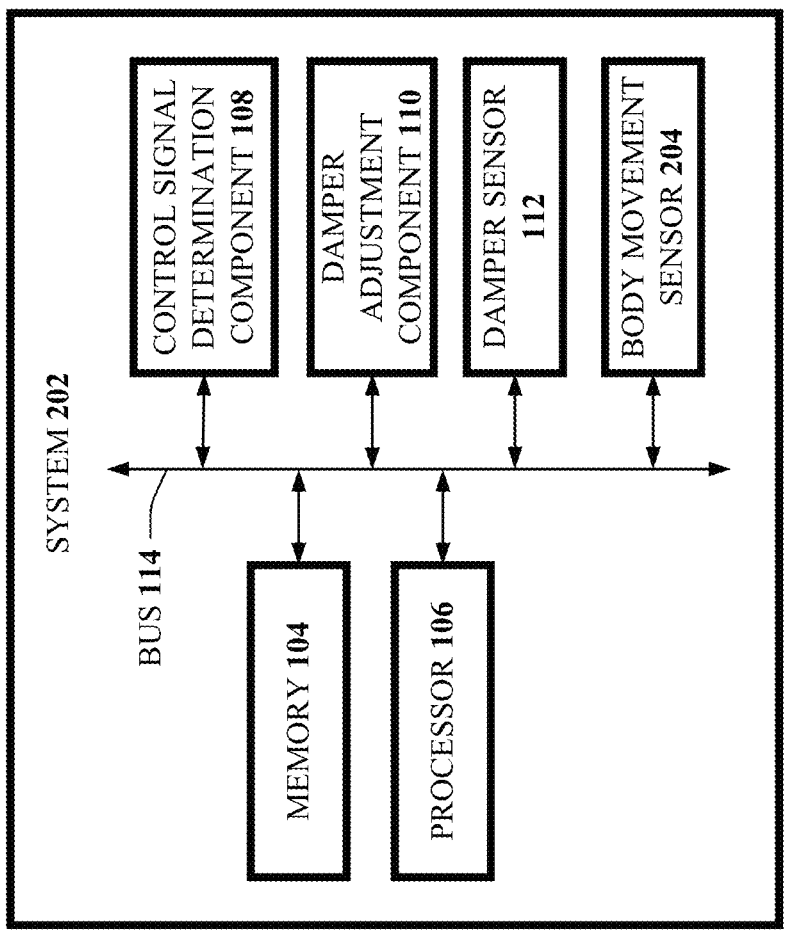
FIG. 2 illustrates a block diagram of an example, non-limiting system that can control a vehicle damper in accordance with one or more embodiments described herein.

Turning now to FIG. 2, there is illustrated a block diagram of an example, non-limiting system 202 in accordance with one or more embodiments described herein. System 202 can be similar to system 102, and can comprise a memory 104, a processor 106, a control signal determination component 108, a damper adjustment component 110, a damper sensor 112, and/or a bus 114. Repetitive description of like elements and/or processes employed in respective embodiments is omitted for sake of brevity.

System 202 can additionally comprise a body movement sensor 204. In this regard, the control signal determination component 108 can further determine damping coefficients and/or rates of change of a level of damping to limit jerk of a damper based on vehicle body movement as detected, for instance, by a body movement sensor 204. According to an embodiment, the body movement sensor 204 can comprise an acceleration sensor, wherein acceleration of a vehicle body can be detected. Other embodiments can detect vehicle body velocity or vehicle body position. Movement or a position of a vehicle can be detected in any axis which can account for vertical motion, lateral motion, or forward/rearward motion. Because rough roads can contain both low and high frequency disturbances, a level of damping can convert to a low value if a higher negative rate of change is allowed as compared to the positive rage of change. In address this, a force gradient function can be utilized by a control signal determination component 108 which can be based on body corner velocity $\dot{Z}_s$ and/or body corner acceleration, $\ddot{Z}s$.

It follows that the control signal determination component 108 can determine a control signal rate which can be continuously limited as a function of measured damper/wheel velocity and damper acceleration (e.g., by damper sensor 112), and/or body acceleration and body velocity (e.g., by body movement sensor 204), for one or more corners of a vehicle. These two functions (e.g., (1) based on damper movement; and (2) based on body movement) can be used independently or can be aggregated together. For instance, the control signal determination component 108 can utilize the following Equation (1) because damper force gradient limit based on body motion can be needed to ensure sufficient body damping (e.g., body control) on very rough roads with large low and high frequency disturbances.

$$\dot{u}=\max(\dot{u}_{damper},\dot{u}_{body}) \quad \text{Equation (1)}$$

In various embodiments, one or more of the memory 104, processor 106, control signal determination component 108, damper adjustment component 110, damper sensor 112, a bus 114, and/or body movement sensor 204 can be communicatively or operably coupled to one another to perform one or more functions of the system 202.

Figure 3:
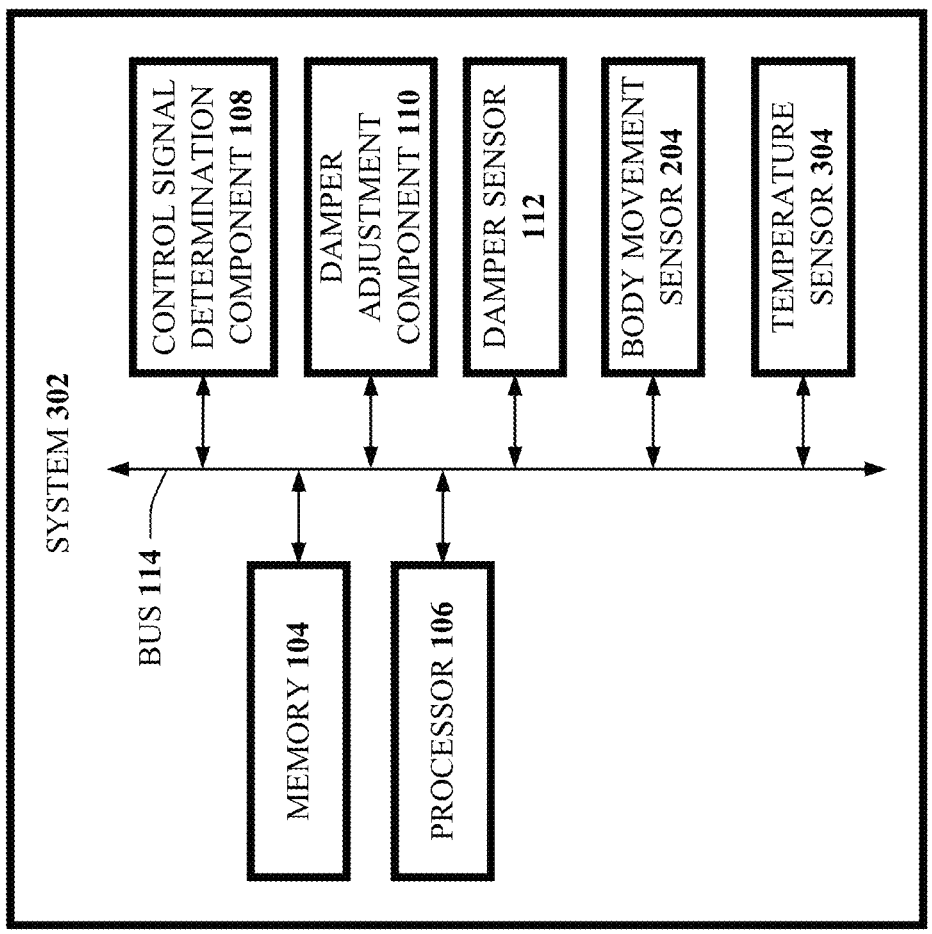
FIG. 3 illustrates a block diagram of an example, non-limiting system that can control a vehicle damper in accordance with one or more embodiments described herein.

Turning now to FIG. 3, there is illustrated a block diagram of an example, non-limiting system 302 in accordance with one or more embodiments described herein. System 302 can be similar to system 202, and can comprise a memory 104, a processor 106, a control signal determination component 108, a damper adjustment component 110, a damper sensor 112, a bus 114, and/or a body movement sensor 204. Repetitive description of like elements and/or processes employed in respective embodiments is omitted for sake of brevity.

System 302 can additionally comprise a temperature sensor 304. Temperature sensor 304 can comprise a thermometer or other type of temperature sensor that measures a temperature of the damper and can output a temperature signal. The control signal determination component 108 can determine a control signal rate which can be continuously limited as a function of measured damper temperature. In this regard, control signal determination component 108 can further determine the a damper control signal corresponding to damping coefficients and/or rates of change of the damping adjustment based on the temperature signal. The foregoing can account for variations in damper firmness at different damper temperatures. According to an embodiment, temperature of an exterior of a damper can be determined. In other embodiments, temperatures of fluid or gas inside a damper can be determined. For instance, The temperature can be used to adapt the rate of change of the control signal, e.g. as a gain on the nominal rate limit:

$$\dot{u}=\dot{u}_{nominal}*f(T) \quad \text{Equation (2)}$$

f(T) can comprise respective look-up table(s) or equation(s). In additional embodiments, temperature can be incorporated in an optimization problem, by setting the penalty on the rate of change of the control signal based on the damper temperature.

In other embodiments, temperature sensor 304 can comprise an ambient temperature sensor, a tire temperature sensor, or other suitable temperature sensor types. Any of the foregoing temperatures can be determined (e.g., by a temperature sensor 304) and such temperatures can be utilized by a control signal determination component 108 to determine the control signal rate.

In various embodiments, one or more of the memory 104, processor 106, control signal determination component 108, damper adjustment component 110, damper sensor 112, a bus 114, body movement sensor 204, and/or temperature sensor 304 can be communicatively or operably coupled to one another to perform one or more functions of the system 302.

Figure 4:
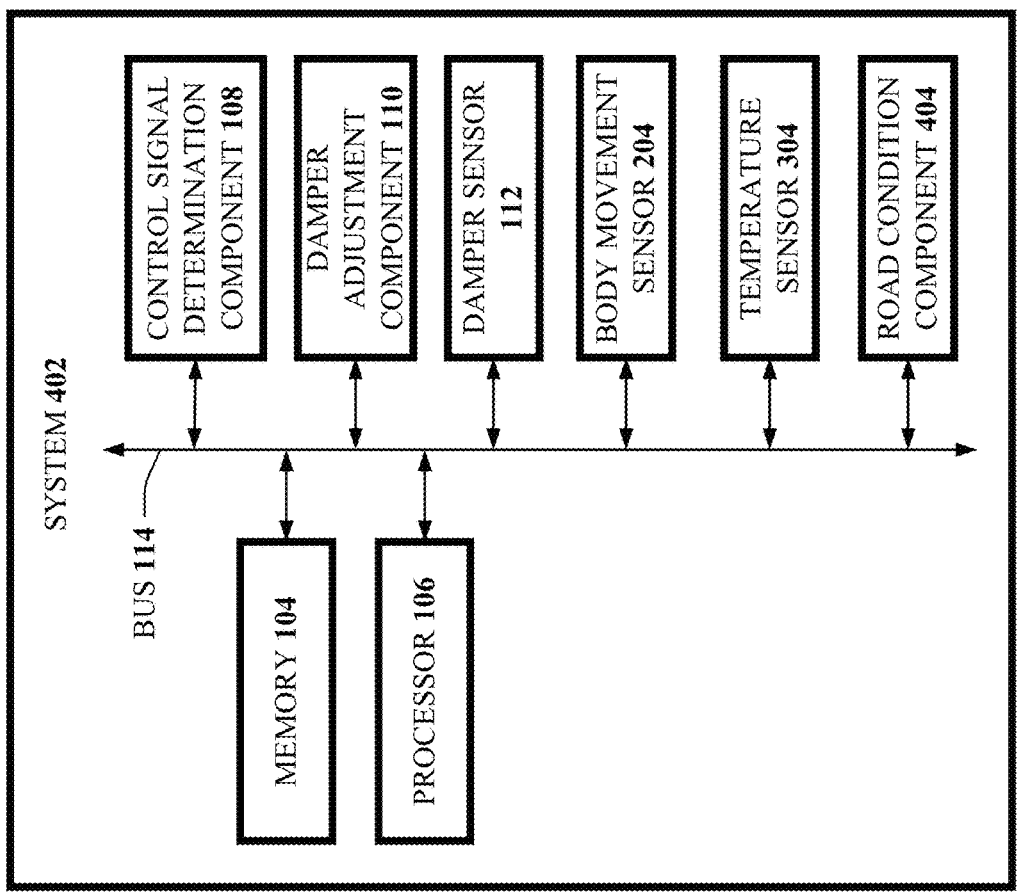
FIG. 4 illustrates a block diagram of an example, non-limiting system that can control a vehicle damper in accordance with one or more embodiments described herein.

Turning now to FIG. 4, there is illustrated a block diagram of an example, non-limiting system 402 in accordance with one or more embodiments described herein. System 402 can be similar to system 302, and can comprise a memory 104, a processor 106, a control signal determination component 108, a damper adjustment component 110, a damper sensor 112, a bus 114, a body movement sensor 204, and/or a temperature sensor 304. Repetitive description of like elements and/or processes employed in respective embodiments is omitted for sake of brevity.

System 402 can additionally comprise a road condition component 404. Road conditions can comprise potholes, animals, rough roads, gravel, bumpy edges, uneven expansion joints, slick surfaces, standing water, debris, snow, ice, objects, road cracks, road construction/repair equipment or indicators, or other types of road conditions. Road condition component 404 can gather road condition information from a variety of sources, such as from an operatively coupled camera system, another vehicle operatively coupled to the system 402, a network, or other sources. In this regard, a camera system can generate such road condition information.

Road condition component 404 can additionally record observed road conditions and store such information in a memory (e.g., memory 104). In this regard, ride quality as facilitated by a damper can be improved by increased awareness of a road condition already experienced by a vehicle comprising the system 402. In other embodiments, this information can be provided to a networked server or another vehicle so that the data (e.g., road condition information) can be utilized by other vehicles. In this regard, a cloud-based vehicle road condition database can be enabled.

It can be appreciated that the control signal determination component 108 can utilize information gathered or aggregated by road condition component 404 to determine an expected jerk caused by a road condition, and adjust a damper control signal (e.g., coefficient or rate of change) to account for the road condition. According to an embodiment, a gain on a nominal rate of change can be applied. In other embodiments, an optimization problem can be utilized, for instance, by setting a penalty on a rate of change of a control signal based on road conditions.

In various embodiments, one or more of the memory 104, processor 106, control signal determination component 108, damper adjustment component 110, damper sensor 112, a bus 114, body movement sensor 204, temperature sensor 304, and/or road condition component 404 can be communicatively or operably coupled to one another to perform one or more functions of the system 402.

Figure 5:
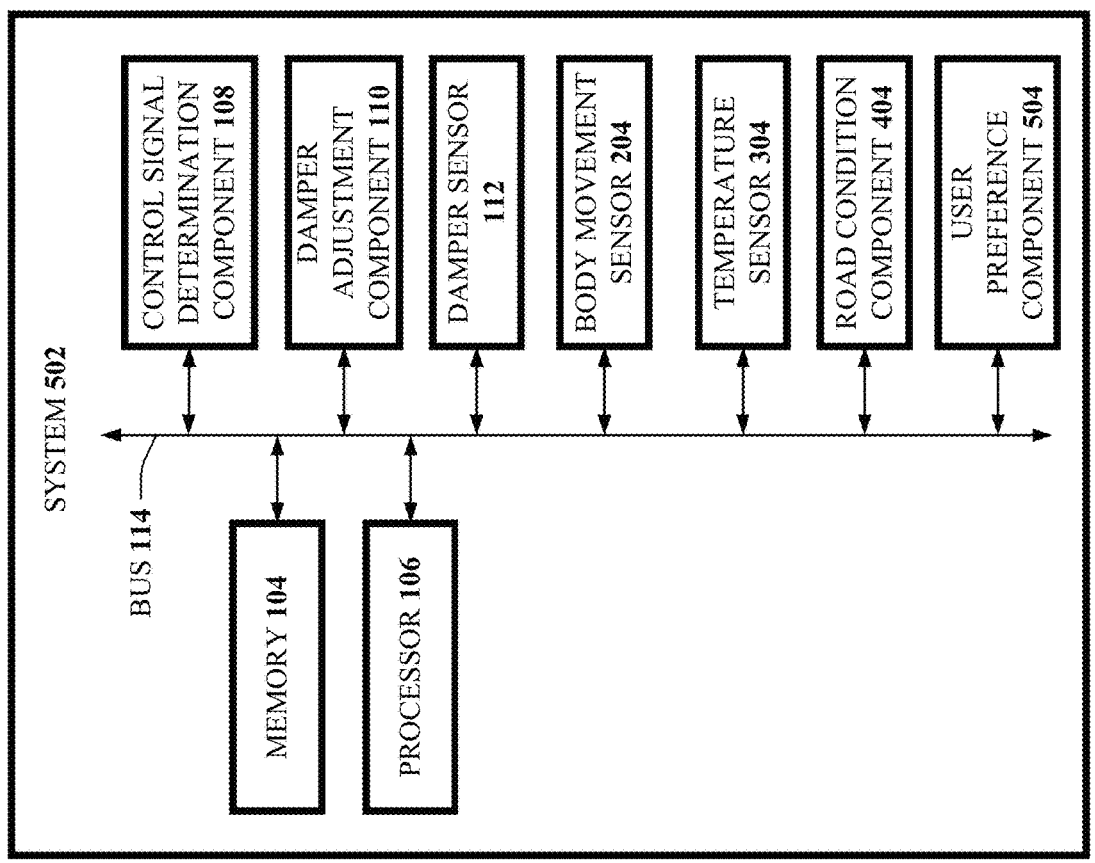
FIG. 5 illustrates a block diagram of an example, non-limiting system that can control a vehicle damper in accordance with one or more embodiments described herein.

With reference to FIG. 5, there is illustrated a block diagram of an example, non-limiting system 502 in accordance with one or more embodiments described herein. System 502 can be similar to system 402, and can comprise a memory 104, a processor 106, a control signal determination component 108, a damper adjustment component 110, a damper sensor 112, a bus 114, a body movement sensor 204, a temperature sensor 304, and/or a road condition component 404. Repetitive description of like elements and/or processes employed in respective embodiments is omitted for sake of brevity.

System 502 can additionally comprise a user preference component 504. User preference component 504 can determine preferences of a user of a vehicle. Such user preferences can correspond to suspension settings, such as a firmness setting, jerk limits, ride-height setting, sway-bar setting, or other suitable, adjustable, suspension parameter. According to an example, a vehicle in a comfort mode may limit jerk more significantly than the same vehicle in a sport mode (e.g., a sport mode intended for more spirited driving than a comfort mode). User preferences can be driver-specific, and a user preference component 504 can determine a driver of a vehicle and/or generate driver profiles for various drivers. Drivers can be identified, for instance, by a key fob, a smartphone communicatively coupled to a vehicle comprising a system 502, via facial recognition or other biometric information, voice recognition, or by other suitable identification systems or methods. In this regard, a damper can be tuned (e.g., by a damper adjustment component 110, in response to a determination by the control signal determination component 108), based on preferences of a driver of a vehicle comprising the system 502 as determined, for instance, by a user preference component 504. User preferences can be input, for example, via an infotainment system of a vehicle, via steering wheel or dashboard controls, via a smartphone or computer operatively coupled to a vehicle comprising the system 502, by voice commands, or via other suitable input systems or methods.

In various embodiments, one or more of the memory 104, processor 106, control signal determination component 108, damper adjustment component 110, damper sensor 112, a bus 114, body movement sensor 204, temperature sensor 304, road condition component 404 and/or user preference component 504 can be communicatively or operably coupled to one another to perform one or more functions of the system 502.

Figure 6:
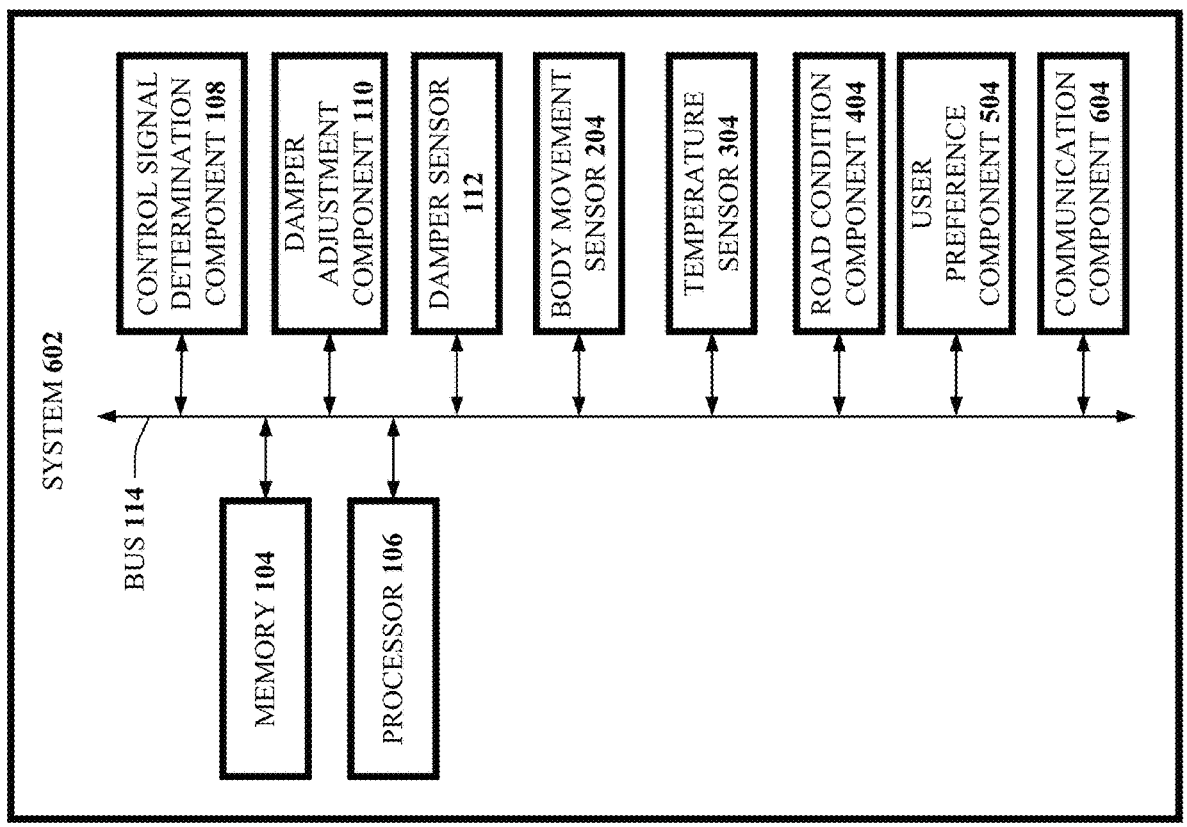
FIG. 6 illustrates a block diagram of an example, non-limiting system that can control a vehicle damper in accordance with one or more embodiments described herein.

Turning now to FIG. 6, there is illustrated a block diagram of an example, non-limiting system 602 in accordance with one or more embodiments described herein. System 602 can be similar to system 502, and can comprise a memory 104, a processor 106, a control signal determination component 108, a damper adjustment component 110, a damper sensor 112, a bus 114, a body movement sensor 204, a temperature sensor 304, a road condition component 404, and/or a user preference component 504. Repetitive description of like elements and/or processes employed in respective embodiments is omitted for sake of brevity.

System 602 can additionally comprise a communication component 604. Communication component 604 can comprise one or more of a variety of communication systems and/or protocols. Communication component 604 can comprise various receivers and/or transmitters which can utilize, for instance, infrared ("IR"), shortwave transmission, near-field communication ("NFC"), Bluetooth, Wi-Fi, long-term evolution ("LTE"), 3G, 4G, 5G, global system for mobile communications ("GSM"), code-division multiple access ("CDMA"), satellite, visual cues, radio waves, or other suitable communication protocols. Communication component can additionally/alternatively utilize wired communication.

System 602 can communicate with other vehicles, networks, servers, cloud-systems, smartphones, or other entities. Such communication can be utilized, for instance, by a road condition component 404 to gather road condition information or by other components or systems. In other embodiments, the system 602 can send (e.g., output) information (e.g., road condition information) observed by the system 602 to other vehicles or systems (e.g., over a network via the communication component 604).

According to an embodiment, the communication component 604 can be leveraged to update parameters of a corresponding system (e.g., system 602) or otherwise update software or other computer executable components.

According to another embodiment, the communication component 604 can be utilized to communicate with other vehicle systems or subsystems (e.g., over a CAN bus network). This can enable a system 602 to utilize vehicle information, such as tire pressure monitoring system (TPMS), anti-lock brake (ABS) system information, traction control information, stability control information, engine power information, brake pressure information, or other suitable information to improve damper adjustment control to limit jerk (e.g., by a control signal determination component 108). In this regard, a control signal determination component 108 can access the foregoing information. According to an embodiment, such information can be utilized to prioritize vehicle stability over comfort (or comfort over stability). In some situations, encountered by a vehicle, (e.g., situations that cause ABS braking, electronic stability control intervention, or other safety-related situations) it may not be desirable to limit the rate of change of the level of damping significantly, or possibly at all. Instead, body control can be prioritized in such critical situations and comfort can become a lower priority.

In various embodiments, one or more of the memory 104, processor 106, control signal determination component 108, damper adjustment component 110, damper sensor 112, a bus 114, body movement sensor 204, temperature sensor 304, road condition component 404 a user preference component 504, and/or communication component 604 can be communicatively or operably coupled to one another to perform one or more functions of the system 602.

Figure 7:
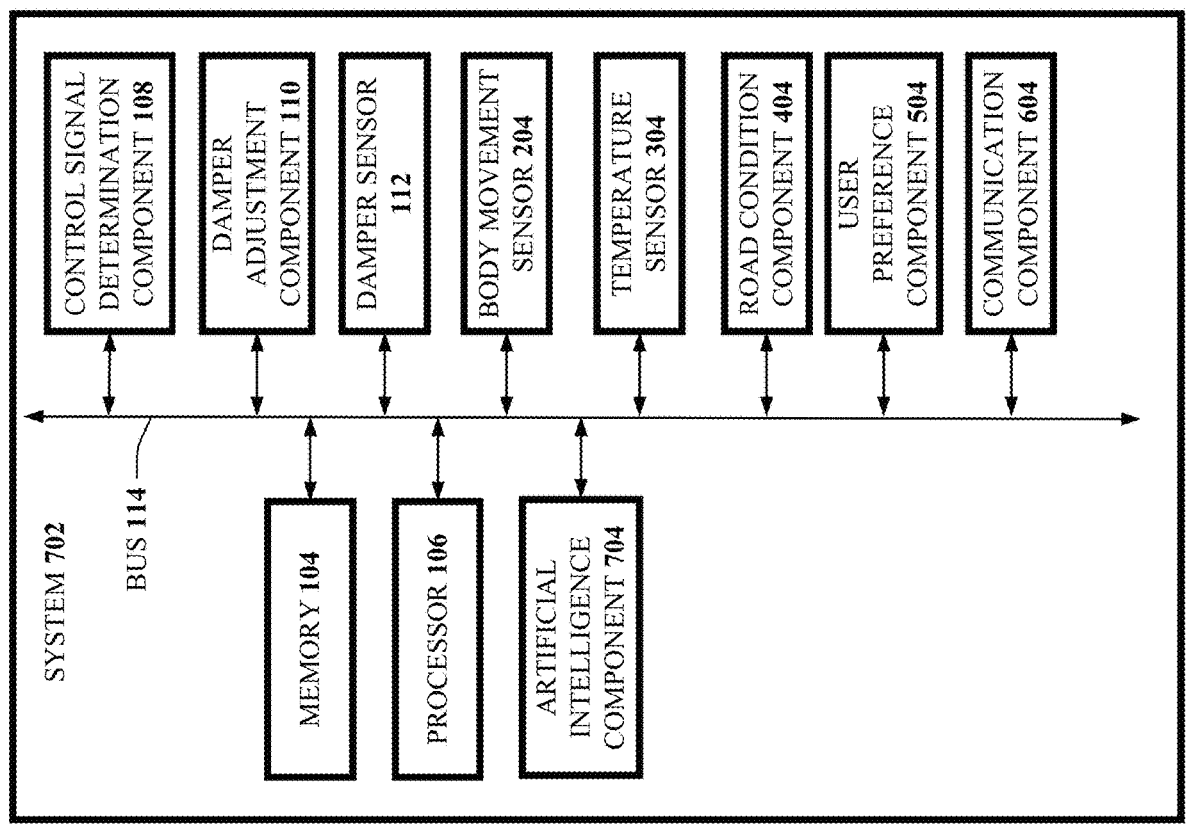
FIG. 7 illustrates a block diagram of an example, non-limiting system that can control a vehicle damper in accordance with one or more embodiments described herein.

FIG. 7 illustrates a block diagram of an example, non-limiting system 702 in accordance with one or more embodiments described herein. System 702 can be similar to system 602, and can comprise a memory 104, a processor 106, a control signal determination component 108, a damper adjustment component 110, a damper sensor 112, a bus 114, a body movement sensor 204, a temperature sensor 304, a road condition component 404, a user preference component 504, and/or a communication component 604. Repetitive description of like elements and/or processes employed in respective embodiments is omitted for sake of brevity.

System 702 can additionally comprise an artificial intelligence component 704. Artificial-intelligence or machine learning systems and techniques can be employed to facilitate learning user behavior, context-based scenarios, preferences, etc. in order to facilitate taking automated action with high degrees of confidence. Utility-based analysis can be utilized to factor benefit of taking an action against cost of taking an incorrect action. Probabilistic or statistical-based analyses can be employed in connection with the foregoing and/or the following.

Artificial intelligence component 704 can learn to: determine a rate of change of a level of damping to limit jerk of a damper based a movement signal of the damper and/or adjust the level of damping at the determined rate of change. For example, artificial intelligence component 704 can comprise and/or employ an artificial intelligence (AI) model and/or a machine learning (ML) model that can learn to perform the above or below described functions (e.g., via training using historical training data and/or feedback data). The artificial intelligence component 704 can additionally learn optimal target/new levels of damping based on vehicle performance needs, user preferences, road conditions, or other factors.

In some embodiments, artificial intelligence component 704 can comprise an AI and/or ML model that can be trained (e.g., via supervised and/or unsupervised techniques) to perform the above described functions using historical training data comprising various context conditions that correspond to various jerk limiting and/or damper adjustment operations. In this example, such an AI and/or ML model can further learn (e.g., via supervised and/or unsupervised techniques) to perform the above described functions using training data comprising feedback data from various vehicle systems, such as suspension systems comprising damper(s), that can be associated with the vehicle, where such feedback data can be collected and/or stored (e.g., in memory 104) by artificial intelligence component 704. In this example, such feedback data can comprise the various instructions described above/below that can be input, for instance, to a system 702, over time in response to observed/stored context-based information. In some embodiments, based on learning to perform the functions described above, artificial intelligence component 704 can perform such functions in the same manner and/or using the same resources as that of control signal determination component 108, damper adjustment component 110, damper sensor 112, body movement sensor 204, temperature sensor 304, road condition component 404, user preference component 504, and/or communication component 604.

Artificial intelligence component 704 can initiate an operation associated with a vehicle based on a defined level of confidence determined using information (e.g., feedback data) acquired from, for instance, a damper sensor 112, body movement sensor 204, temperature sensor 304, road condition component 404, user preference component 504, and/or communication component 604. For example, based on learning to perform such functions described above using the above defined feedback data, artificial intelligence component 704 can initiate an operation associated with the vehicle if it determines, based on such feedback data, that a vehicle may experience a jerk due to a damper control signal adjustment rate being too fast. For instance, based on learning to perform such functions described above using the above defined feedback data, artificial intelligence component 704 can determine damping coefficients, control signal adjustment rates and/or send associated control signals to a damper of a vehicle.

In an embodiment, artificial intelligence component 704 can perform a utility-based analysis that factors cost of initiating the above described operations associated with the vehicle versus benefit. For example, in some instances, although a rate of change can be set at a sport mode/level intended for spirited driving, the artificial intelligence component 704 can determine that a jerk, otherwise permissible in a sport mode, may cause damage to an associated vehicle, vehicle component, or vehicle contents, and further determine that a jerk should be further limited, despite the higher jerk tolerance of such a sport mode. In this example, the artificial intelligence can cause the damper adjustment component 110 to apply a control signal to a damper with a rate of change determined by the artificial intelligence component 704. In this embodiment, artificial intelligence component 704 can use one or more additional context conditions to determine whether a current certain rate of change should be modified. Such context conditions can comprise vehicle information (e.g., vehicle weight, body corner weight, vehicle speed, vehicle type, vehicle modifications, vehicle system faults, fuel level, tire pressure, tire temperature, vehicle location), occupant information (e.g., quantity of occupants, ages of occupants, health conditions of occupants, or other suitable occupant information), or other information such as ambient temperature, time of day, day of week, weather conditions, traffic conditions, or other suitable information.

To facilitate the above described functions, artificial intelligence component 704 can perform classifications, correlations, inferences, and/or expressions associated with principles of artificial intelligence. For instance, artificial intelligence component 704 can employ an automatic classification system and/or an automatic classification. In one example, artificial intelligence component 704 can employ a probabilistic and/or statistical-based analysis (e.g., factoring into the analysis utilities and costs) to learn and/or generate inferences. Artificial intelligence component 704 can employ any suitable machine-learning based techniques, statistical-based techniques and/or probabilistic-based techniques. For example, artificial intelligence component 704 can employ expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or the like. In another example, artificial intelligence component 704 can perform a set of machine learning computations. For instance, artificial intelligence component 704 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

In various embodiments, one or more of the memory 104, processor 106, control signal determination component 108, damper adjustment component 110, damper sensor 112, a bus 114, body movement sensor 204, temperature sensor 304, road condition component 404 a user preference component 504, communication component 604, and/or artificial intelligence component 704 can be communicatively or operably coupled to one another to perform one or more functions of the system 702.

Figure 8:
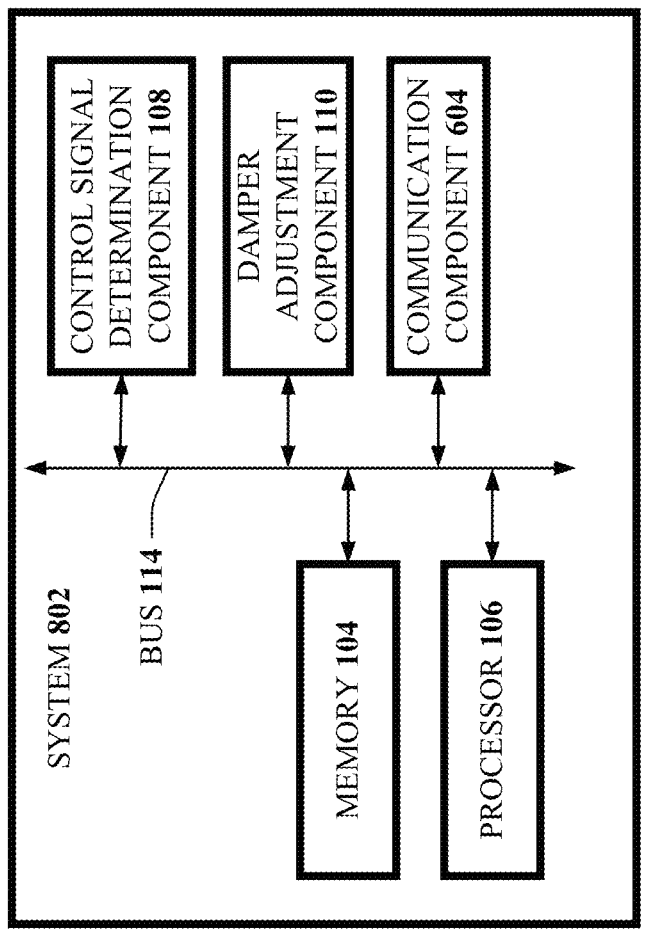
FIG. 8 illustrates diagram of an example, a non-limiting system that can control a vehicle damper in accordance with one or more embodiments described herein.

With reference to FIG. 8, there is illustrated a block diagram of an example, non-limiting system 802 in accordance with one or more embodiments described herein. System 802 comprise a memory 104, a processor 106, a control signal determination component 108, a damper adjustment component 110, a bus 114, and/or a communication component 604. Repetitive description of like elements and/or processes employed in respective embodiments is omitted for sake of brevity.

According to an embodiment, a level of damping for each wheel of a vehicle (e.g., a vehicle comprising the system 802) can be cloud-based (as opposed to local-sensor-based adjustment). In this regard, a system 802 (e.g., via a communication component 604) can communicate with a cloud-based system (e.g., a remote data source) to access and/or determine a level of damping from another vehicle or from a group of other vehicles. In other embodiments, the system 802 can access damping levels directly from other vehicles without a cloud-based system as a medium. It can be appreciated that an associated cloud-based system or another vehicle can be considered a remote data source. According to an embodiment, after acquiring the information indicative of the level of damping from another vehicle or from a group of other vehicles, the control signal determination component 108 can determine, separately, a target level of damping for each wheel (e.g., each damper associated with a wheel) of a vehicle comprising the system 802 based on the information indicative of the level of damping from the another vehicle or from the group of other vehicles. The information can comprise individual damping levels for each damper of the other vehicle or vehicles. Further, the control signal determination component can determine, separately, a rate of change from a current level of damping for each wheel to the target level of damping for each wheel. The rate of change can be configured to limit jerk of an associated vehicle damper as previously discussed.

According to an embodiment, a damping level for another vehicle or vehicles can be associated with a specific geographic location. In this regard, an event (e.g., a bump) can be geotagged such that a subsequent vehicle (e.g., the vehicle comprising the system 802) can set appropriate damping levels and/or rates of change to such damping levels based on the information.

When the information comprises information of a vehicle of the same time (e.g., a car, SUV, station wagon, sports car, crossover, or other vehicle type), the control signal determination component 108 can utilize a 1:1 conversion, or a substantially 1:1 conversion of a levels of damping from other vehicles. The control signal determination component 108 can utilize vehicle characteristics, such as size, weight, speed, or other suitable characteristics when adapting/converting another vehicle's damping levels or rates of change to the vehicle comprising the system 802. In this regard, a damping level from a vehicle type (e.g., a car, SUV, station wagon, sports car, crossover, or other vehicle type) that is different from the vehicle comprising a system herein can be converted for the subject vehicle. For instance, a vehicle of greater weight can require greater damping than a vehicle of lower weight. Damping coefficients can be converted between vehicle types according to a lookup table, conversion algorithm, using machine learning, or with a different suitable conversion. Once appropriate levels of damping and/or rates have been determined (e.g., by the control signal determination component 108), the damper adjustment component 110 can adjust associated vehicle dampers. It can be appreciated that a route can comprise a plurality of geographic locations of events that comprise varying damping levels or rates, and the control signal determination component 108 can determine a plurality of future damping levels or rates based on a route (e.g., a common route between the vehicle and another vehicle or vehicles). In this regard, a route previously traveled by another vehicle can comprise a group or plurality of damping coefficients, all of which can be accessed, determined, and/or converted for a similar or different vehicle traveling that same route currently or in the future.

In various embodiments, one or more of the memory 104, processor 106, control signal determination component 108, damper adjustment component 110, a bus 114, and/or communication component 604 can be communicatively or operably coupled to one another to perform one or more functions of the system 802.

According to an embodiment, the control signal determination component 108 can determine movement (e.g., change in position, velocity, or acceleration) of a front damper of a vehicle (e.g., using a damper sensor 112), an amount of time between a first time when the movement of the front damper occurs and a second time when a rear damper of the vehicle will experience a condition which caused the movement of the front damper, a current damping coefficient of the front damper, a current damping coefficient of the rear damper, positions (e.g., travel lengths, heights) of the front damper at various points in time including current time, positions (e.g., travel lengths, heights) of the rear damper at various points in time including current time, a distance between a front damper and a rear damper (e.g., vehicle wheelbase), a speed of a vehicle comprising the front damper and the rear damper (e.g., dampers 904 which are later discussed in greater detail), and/or a direction of travel of said vehicle, vehicle weight, force experienced by the front damper, travel of the front damper or vehicle suspension, etc. The control signal determination component 108 can determine, based on one or more of the foregoing factors, a rear damping coefficient (e.g., a new, future, or target coefficient) of the rear damper configured to prevent rear suspension impact with an end stop caused by rear suspension compression or rebound/extension based on the movement of the front damper, the amount of time, and the front damping coefficient (and/or other factors discussed above). This determination can result in a determined rear damping coefficient and/or a rate of change to the rear damping coefficient (e.g., new/target damping coefficient from a current damping coefficient). According to an embodiment, the damper adjustment component 110 can send a damper adjustment signal comprising the rear damping coefficient (e.g., new/target rear damping coefficient) to the rear damper. In this regard, information learned by movement of a front damper can be used to better prepare a rear damper for that same condition experienced by the front damper when an associated vehicle is moving in a forward direction. The opposite can occur when the vehicle 900 is moving in a rearward direction (e.g., a control signal for a front damper can be determined by a control signal determination component 108 based on movement of a rear damper, an amount of time between a first time when the movement of the rear damper occurs and a second time when the front damper will experience a condition which caused movement of the rear damper, and a rear damping coefficient among other factors discussed above).

Control signals for a rear damper described herein can be determined (e.g., by a control signal determination component 108) using look-up tables and can be delayed to a rear axle. It can be appreciated that the foregoing can prevent full compression of a damper. In other words, the rear damping coefficient can be configured to prevent rear suspension impact with an end stop caused by rear suspension compression. In this regard, a vehicle suspension (e.g., a rear damper) can be prevented from "bottoming out" by adjusting a rear damping coefficient. Similarly, complete damper extension can be prevented from rebound of a vehicle damper (damper motion in direction opposite to compression). Consequently, full compression or rebound of the rear damper can be prevented using the rear damping coefficient. According to an embodiment, the control signal can be configured to mitigate an impact between a rear suspension component (e.g., an end stop pad or bump stop pad of an associated vehicle) and an end stop (e.g., a bump stop of an associated vehicle) or to prevent full compression of a vehicle damper or shock absorber. It can be appreciated that a vehicle such as a vehicle can comprise such suspension components (e.g., bump stop pads or bump stops). As described herein, an impact force at or below a threshold impact force can be permitted (e.g., by a control signal determination component 108). In this regard, a predicted impact force can be determined (e.g., by a control signal determination component 108) for various damping coefficients and a corresponding damping coefficient resulting in an impact force at or below the threshold impact force can be selected (e.g., by the control signal determination component 108). Such predictions can be based on, for instance, movement of the front damper, a current damping coefficient of the front damper, a current damping coefficient of the rear damper, positions (e.g., travel lengths, heights) of the front damper at various points in time including current time, positions (e.g., travel lengths, heights) of the rear damper at various points in time including current time, a distance between a front damper and a rear damper (e.g., vehicle wheelbase), a speed of a vehicle comprising the front damper and the rear damper (e.g., dampers 904 which are later discussed in greater detail), and/or a direction of travel of said vehicle, vehicle weight, force experienced by the front damper, travel of the front damper or vehicle suspension, etc. Threshold impact forces herein can be predetermined or configurable based on user preferences, driving modes, or other system configurations.

In an embodiment, road condition information (e.g., as accessed by the system 902 from another vehicle operatively coupled to the vehicle 900 or from a different source such as a cloud-based network) can be further utilized in the determination of the rear damping coefficient and/or the rate at which to adjust to the rear damping coefficient based on the acquired road condition information. According to an example, system 902 can access road condition information determined by a second vehicle operatively coupled to the vehicle, and further determine a rear damping coefficient based on the road condition information. For instance, cloud-based information from other vehicles can be utilized. By storing information regarding vehicle type, vehicle speed, and suspension deflection for other vehicles when they encounter a road condition, system 902 can predict the likelihood that the front and rear suspension will hit the end stop during the road condition (e.g., a bump). A control signal can therefore be sent (e.g., by system 902) to mitigate the impact with the end stops.

Additional embodiments can comprise a communication component 604. The communication component 604 can access road condition information determined by a second vehicle operatively coupled to the vehicle. The control signal determination component 108 can further determine the rear damping coefficient based on the road condition information. Further, the communication component 604 can provide road condition information and associated vehicle damping responses to a network so that such information can be utilized by other vehicles or systems.

In yet another embodiment, a control signal determination component 108 can be configured to prevent full compression of a damper (e.g., a rear damper). In this regard, a rear damping coefficient can be determined such that a road condition (e.g., a bump experienced by a front axle or front wheel) will not cause a rear damper to fully compress. This can be based on vehicle weight or sprung mass over a specific damper, vehicle speed, travel length of a vehicle damper or vehicle suspension, instantaneous compression of a damper or vehicle suspension, and/or force exerted on the vehicle and/or damper by the road condition.

In an additional embodiment, a control signal determination component 108 can determine (e.g., using a body movement sensor 204) movement of an occupant of a vehicle. In this regard, the rear damping coefficient can be further based on the movement of the occupant. For instance, an occupant sensor (e.g., a pressure sensor located within a seat) can determine an instantaneous force against a seat caused by an occupant. According to an example, a vehicle occupant may reach from a front passenger seat to a rear seat to retrieve an item. During this retrieval, the occupant can alter the center of mass of a corresponding vehicle, and/or the occupant may jostle or bounce from the seat during the retrieval maneuver. A system herein can utilize the determined occupant movement (e.g., instantaneous force applied by an occupant to a seat of a vehicle and transmitted to the vehicle) when determining the rate of change for damper adjustment to ensure jerk is still limited despite the occupant movement. It can therefore be appreciated that damper adjustment (e.g., rate of damper adjustment) as determined by the control signal determination component 108 and facilitated by the damper adjustment component 110 can be based on part on the occupant movement. In this regard, a rate of change formula or lookup table can include force corresponding to movement of an occupant of a vehicle. In this regard, occupant size and/or location in a vehicle can be accommodated. For instance, a mass of a vehicle body above each wheel can change depending on the loading conditions and the driver/passenger positions. A real-time estimation of static vertical load on each of the corners can be utilized to adapt the rate of change limit. This can normalize the jerk level experienced by the driver/passenger for different loading conditions.

It can be appreciated that adjustment of a rear damper can utilize a control signal that comprises a rate of change limitation for an adjustment to a new/target damping coefficient from a current damping coefficient, such that jerk in the rear damper is limited. In this regard, the rear damping coefficient can be adjusted based on the rate of change limitation.

Further embodiments can utilize artificial intelligence (e.g., using an artificial intelligence component 704) to learn to determine the rear damping coefficient based on the movement of the front damper, the amount of time between the first time and the second time and learns to determine the rear damping coefficient of the rear damper based on the movement of the front damper and the amount of time, and the front damping coefficient. (e.g., via training using historical training data and/or feedback data). Artificial intelligence component 704 can comprise and/or employ an artificial intelligence (AI) model and/or a machine learning (ML) model that can learn to perform the above or below described functions (e.g., via training using historical training data and/or feedback data). Artificial intelligence component 704 can initiate an operation associated with a vehicle based on a defined level of confidence determined using information (e.g., feedback data) acquired from, for instance, a damper sensor 112, body movement sensor 204, temperature sensor 304, road condition component 404, user preference component 504, and/or communication component 604. For example, artificial intelligence component 704 can initiate an operation associated with the vehicle if it determines, based on feedback data, that a current/instant rear damping coefficient of a vehicle may be incorrectly set based on movement of a front vehicle damper. For instance, based on learning to perform such functions described above using the above defined feedback data, artificial intelligence component 704 can determine a control signal adjustment rate and/or send the associated control signal to a rear damper of a vehicle.

Figure 9:
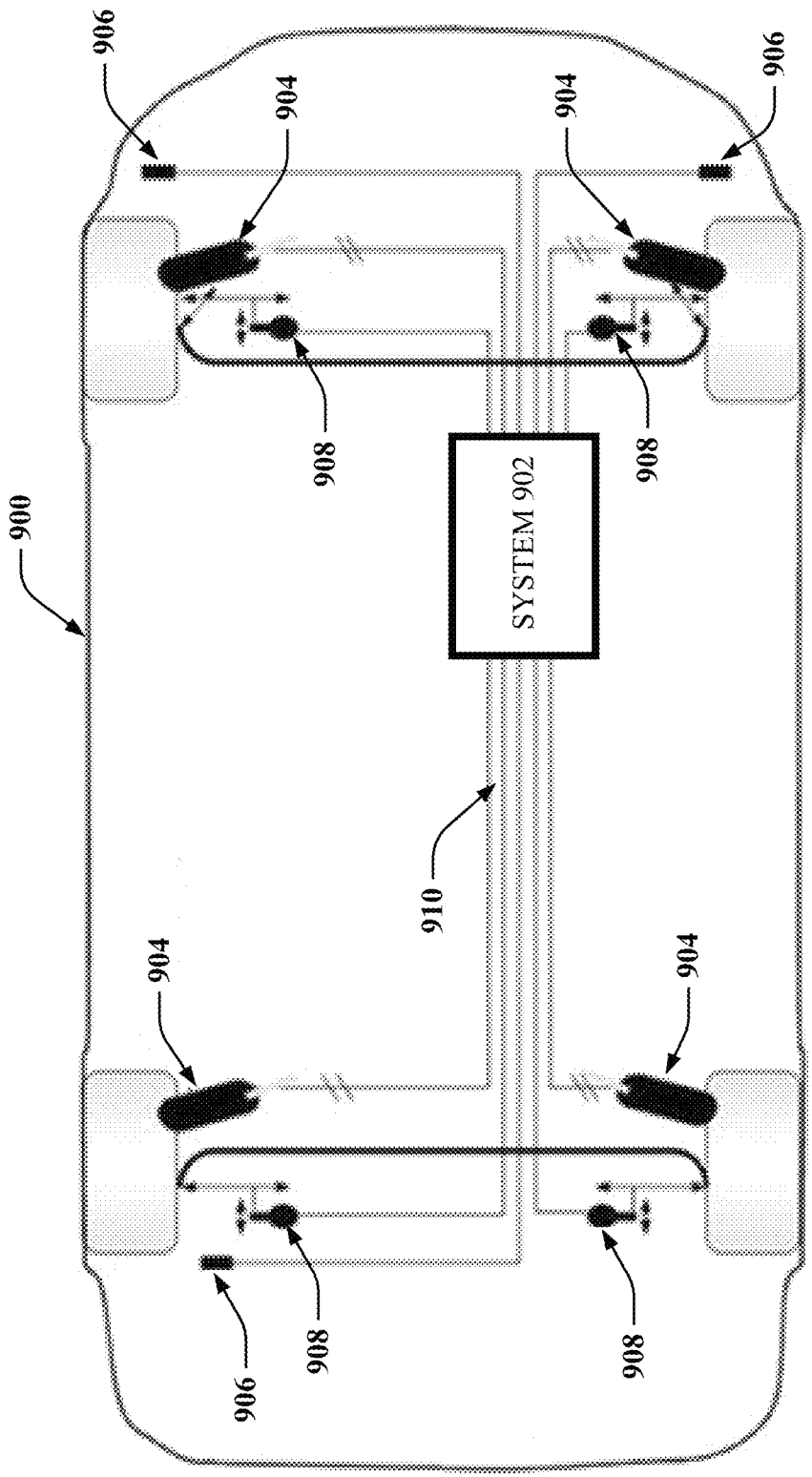
FIG. 9 illustrates diagram of an example, a non-limiting system that can control a vehicle damper in accordance with one or more embodiments described herein.

Turning now to FIG. 9, there is illustrated an exemplary vehicle 900 in accordance with various embodiments described herein. Vehicle 900 can comprise a system 902. According to an embodiment, system 902 can be similar to any of system 102, 202, 302, 402, 502, 602, 702, and/or 802. Vehicle 900 can additionally comprise dampers 904, vehicle body movement sensors 906, damper movement sensors 908, and/or network 910 (e.g., CAN bus).

Dampers 904 can be active or semi-active (e.g., adaptive). Dampers 904 can be utilized to adjust firmness of the suspension of vehicle 900. Changes in firmness/damping coefficient can cause a jerk if adjusted too rapidly. Therefore, a control signal sent by a system 902 to a damper 904 can be determined and/or adapted to limit a jerk experienced at a damper 904. This can increase ride comfort for a driver/passenger of the vehicle 900.

Vehicle body movement sensors 906 can comprise acceleration sensors, wherein acceleration of a body of a vehicle 900 can be detected. In other embodiments, vehicle body movement sensors 906 can detect vehicle body velocity or vehicle body position. Movement or a position of a vehicle 900 can be detected in any axis which can account for vertical motion, lateral motion, or forward/rearward motion.

Damper movement sensors 908 can detect a damper position or damper movement, such as damper velocity, damper acceleration, damper jerk, and/or damper force gradient. The damper movement sensors 908 can send signals comprising position or movement information of associated damper 904 to the system 902 (e.g., over a network 910), which can enable the system 902 to adapt to road conditions causing compression or rebound of any of the dampers 904.

In another embodiment, a control signal for a rear damper (e.g., comprising a rear damping coefficient) can be determined by a system 902 based on movement of a front damper and an amount of time between a first time when the movement of the front damper occurs and a second time when the rear damper will experience a condition which caused the movement of the front damper. Stated otherwise, information learned by movement of a front damper can be used to better prepare a rear damper for that same condition, when the vehicle 900 is moving in a forward direction. The opposite can occur when the vehicle 900 is moving in a rearward direction (e.g., a control signal for a front damper can be determined by a system 902 based on movement of a rear damper and an amount of time between a first time when the movement of the rear damper occurs and a second time when the front damper will experience a condition which caused movement of the rear damper). The control signal for a rear damper can be determined using look-up tables and can be delayed to a rear axle. It can be appreciated that the foregoing can prevent full compression of a damper or can mitigate impact force experienced by a vehicle body as caused by full compression or rebound of a damper of vehicle.

In an embodiment, road condition information (e.g., as accessed by the system 902 from another vehicle operatively coupled to the vehicle 900 or from a different source such as a cloud-based network) can be further utilized in the determination of the rear damping coefficient and/or the rate at which to adjust to the rear damping coefficient based on the acquired road condition information. According to an example, system 902 can access road condition information determined by a second vehicle operatively coupled to the vehicle, and further determine a rear damping coefficient based on the road condition information. For instance, cloud-based information from other vehicles can be utilized. By storing information regarding vehicle type, vehicle speed, and suspension deflection for other vehicles when they encounter a road condition, system 902 can predict the likelihood that the front and rear suspension will contact the end stop during the road condition (e.g., a bump) and/or the force with which such an impact will occur. A control signal can therefore be sent (e.g., by system 902) to mitigate or prevent the impact with the end stops.

In yet another embodiment, movement of an occupant of a vehicle 900 can be determined, and a rear damping coefficient can be further based on the movement of the occupant. In this regard, movement of occupant(s) of a vehicle can be determined (e.g., via a vehicle cabin camera, seat sensor, or other suitable sensor). A corresponding system as described herein can account for occupant movement when determining the rear damping coefficient and/or the rate at which to adjust to the rear damping coefficient. According to an example, a vehicle occupant may reach from a front passenger seat to a rear seat to retrieve an item. During this retrieval, the occupant can alter the center of mass of a corresponding vehicle, and the occupant may jostle or bounce from the seat during the retrieval maneuver, the system can utilize the determined occupant movement when determining the rate of change for damper adjustment to prevent or mitigate full damper compression and/or to ensure jerk is still limited despite the occupant movement.

Figure 10:
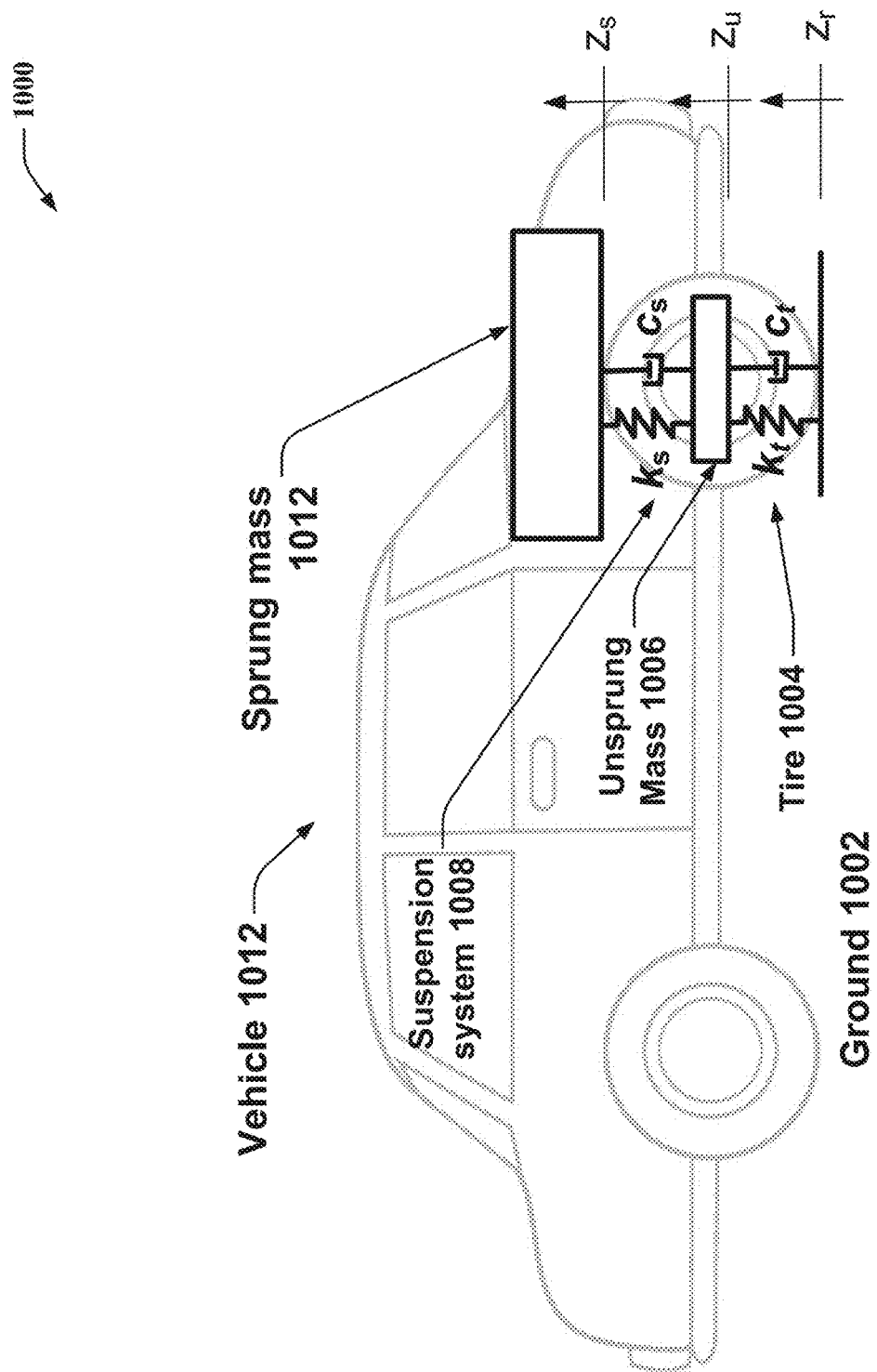
FIG. 10 illustrates diagram of an example, a non-limiting system that can control a vehicle damper in accordance with one or more embodiments described herein.
Figure 11:
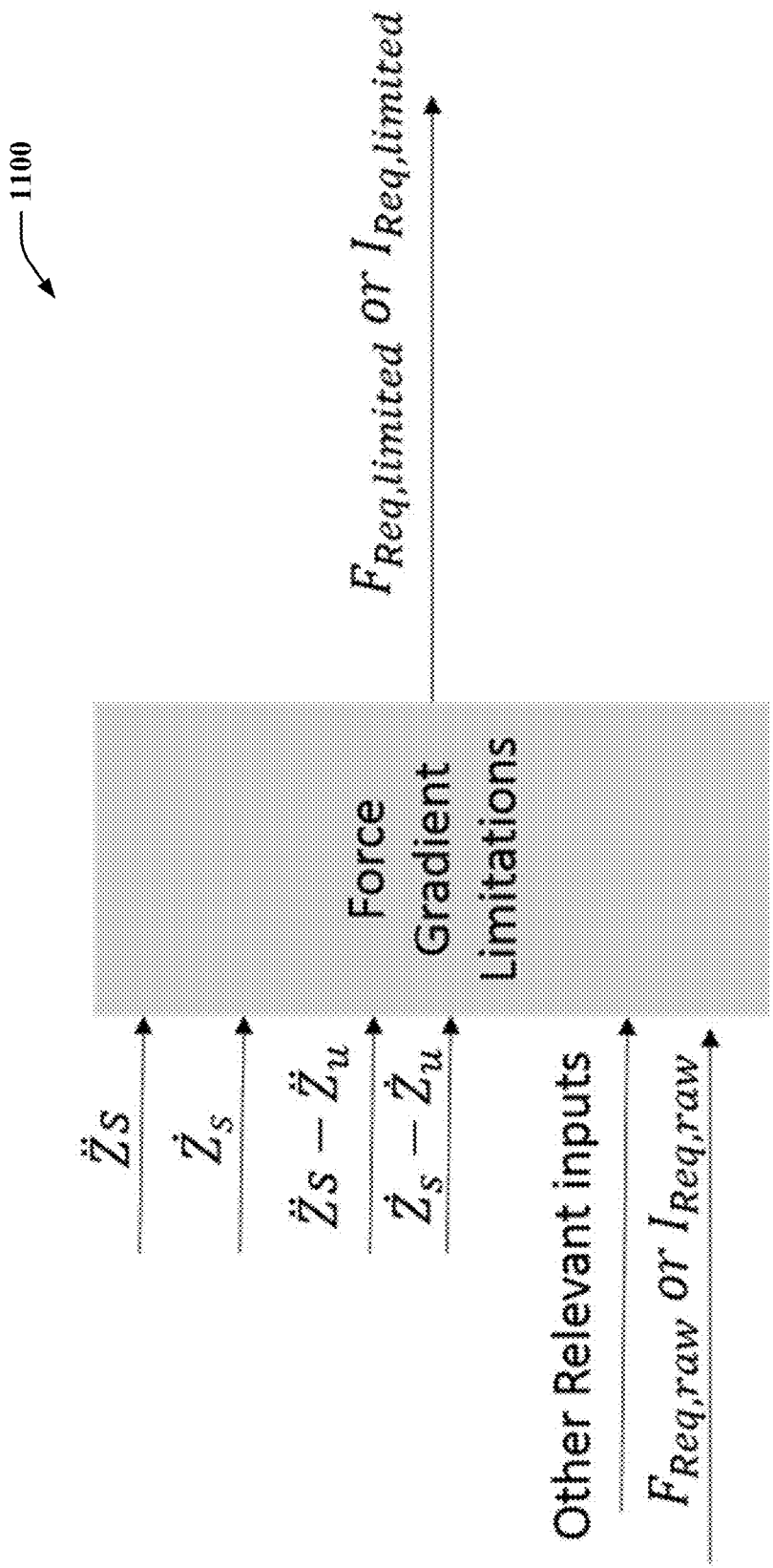
FIG. 11 illustrates diagram of example, non-limiting system methodology that can control a vehicle damper in accordance with one or more embodiments described herein.

With reference to FIG. 10, there is illustrated an exemplary diagram 1000 in accordance with various embodiments herein. Diagram 1000 illustrates ground 1002, tire 1004, unsprung mass 1006 of a vehicle 1012, suspension system 1008 of a vehicle 1012, and sprung mass 1010 of a vehicle 1012. As depicted herein, $z_s$ can represent motion of the sprung mass 1010, $z_u$ can represent motion of the unsprung mass 1006, $z_r$ can represent road displacement, $k_s$ can represent spring stiffness (e.g., of a suspension system 1008 which can include a damper), $c_s$ can represent the damping coefficient, $k_t$ can represent tire stiffness, and $C_t$ can represent tire damping. FIG. 11 illustrates exemplary methodology 1100 using like variables and/or other various inputs/outputs. FIG. 11 provides a basic, exemplary depiction of the flow of information for a system (e.g., a system 202) and other relevant inputs that can be utilized by systems or components herein. Other Relevant inputs herein can comprise body mass, road conditions, tire pressure, ambient temperature, tire temperature, damper temperature, visual inputs (e.g., pattern recognition), or other relevant inputs. In this regard, Force Gradient Limitations (e.g., facilitated via a control signal) can be based on sprung mass acceleration, sprung mass velocity, unsprung mass acceleration, unsprung mass velocity, road displacement, input force or inertia, or other suitable inputs. In this regard, jerk of a damper can be limited. Therefore, it can be appreciated that a control signal (e.g., as determined by a control signal determination component 108) can be based on a sprung mass of a vehicle to which a damper is coupled or sprung mass motion of a vehicle to which the damper is coupled in addition to other factors discussed herein.

Figure 12:
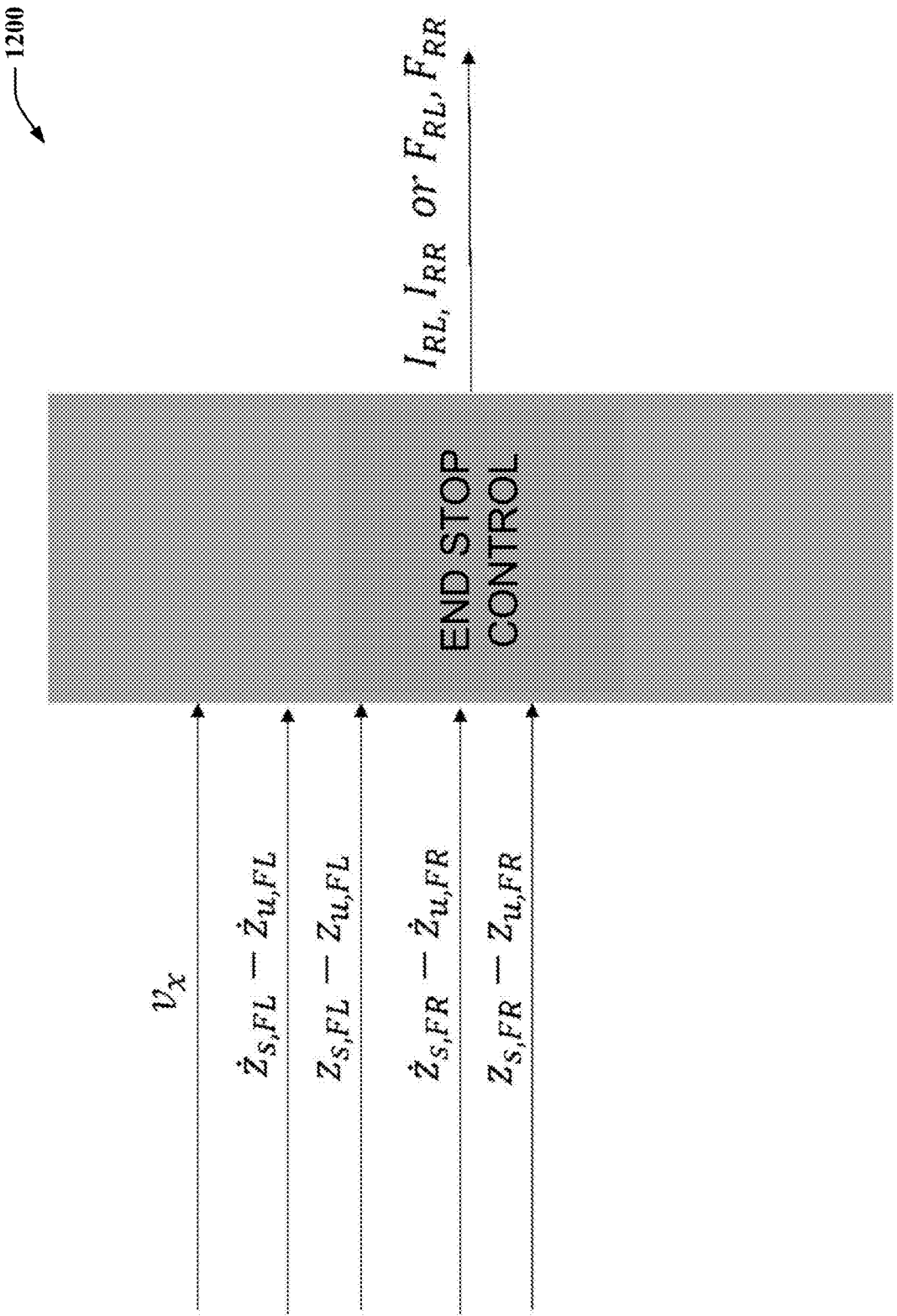
FIG. 12 illustrates diagram of example, non-limiting system methodology that can control a vehicle damper in accordance with one or more embodiments described herein.

Turning now to FIG. 12, exemplary methodology 1200 in accordance with various embodiments herein is depicted. As depicted herein, $z_s$ can represent motion of sprung mass and $z_u$ can represent motion of unsprung mass. FL can correspond to a front left damper, FR can correspond to a front right damper, RL can correspond to a rear left damper, and RR can correspond to a rear right damper. In this regard, a control signal for a rear damper (e.g., comprising a rear damping coefficient) can be determined based on movement of a front damper and an amount of time between a first time when the movement of the front damper occurs and a second time when the rear damper will experience a condition which caused the movement of the front damper. Information learned by movement of a front damper can be used to better prepare a rear damper for that same condition when a vehicle is moving in a forward direction.

Methodology 1200 is not limited to dual axle vehicles. According to an embodiment, a vehicle can comprise three axles. A control signal for a mid-axle damper can be determined based on movement of a front damper and an amount of time between a first time when the movement of the front damper occurs and a second time when the rear damper will experience a condition which caused the movement of the front damper. A control signal for a rear-axle damper can be determined based on movement of a front damper and/or mid-axle damper, and an amount of time between a first time when the movement of the front damper occurs and/or a second time when movement of a mix-axle damper occurs, and a third time when the rear damper will experience a condition which caused the movement of the front damper and/or mid-axle damper.

According to an embodiment, a trailer towed behind a vehicle (e.g., vehicle 900) can comprise damping systems similar to those described herein. In this regard, a control signal for a trailer-axle damper can be determined based on movement of a vehicle front damper and/or vehicle rear damper, and an amount of time between a first time when the movement of the vehicle front damper occurs and/or a second time when movement of a vehicle rear damper occurs, and a third time when the trailer damper will experience a condition which caused the movement of the vehicle front damper and/or vehicle rear damper. Additionally, for trailers comprising more than one axle, a plurality of trailer axles can utilize systems and embodiments described herein, and trailer axle damper adjustment/rate can be based on vehicle damper information and/or other damper information from other axles of the same trailer.

Figure 13:
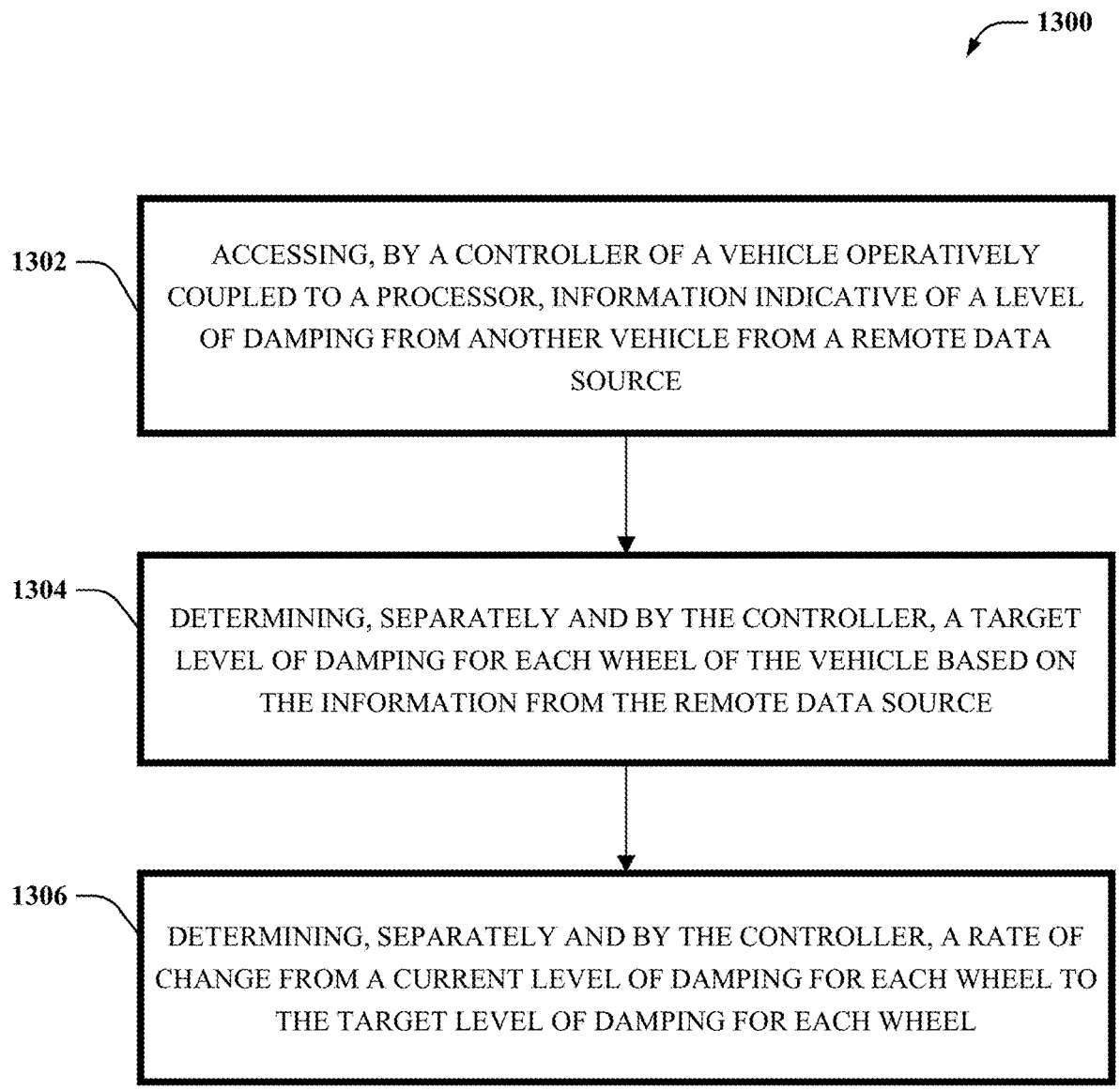
FIG. 13 illustrates a flow diagram of an example, non-limiting computer-implemented method that limits jerk of a vehicle damper in accordance with one or more embodiments described herein.

FIG. 13 illustrates a flow diagram of an example, non-limiting computer-implemented method 1300 that can determine a level of damping in accordance with one or more embodiments described herein. Repetitive description of like elements and/or processes employed in respective embodiments is omitted for sake of brevity.

At 1302, computer-implemented method 1300 can comprise accessing, by a controller (e.g., system 102, 202, 302, 402, 502, 602, 702, 802, and/or 902) operatively coupled to a processor, information indicative of a level of damping from another vehicle from a remote data source.

At 1304, the computer-implemented method 1300 can comprise determining, separately and by the controller, a target level of damping for each wheel of the vehicle based on the information from the remote data source.

At 1306, the computer-implemented method 1300 can comprise determining, separately and by the controller, a rate of change from a current level of damping for each wheel to the target level of damping for each wheel.

Figure 14:
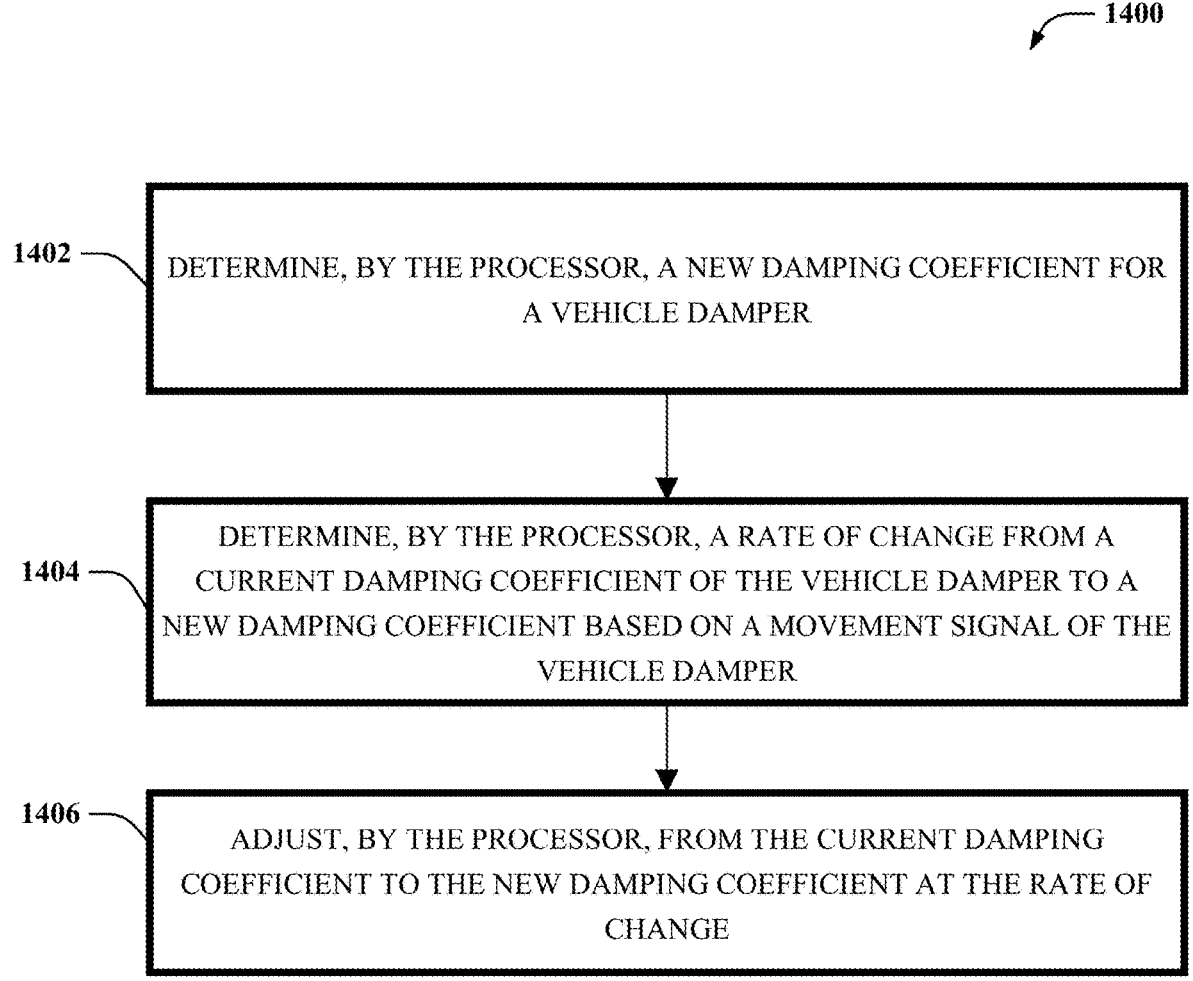
FIG. 14 illustrates a flow diagram of an example, computer program product that can cause a processor to control a vehicle damper in accordance with one or more embodiments described herein.

FIG. 14 illustrates a flow diagram of example, non-limiting program instructions 1400 that can facilitate jerk limitation in accordance with one or more embodiments described herein. Repetitive description of like elements and/or processes employed in respective embodiments is omitted for sake of brevity.

At 1402, a new damping coefficient for a vehicle damper (e.g., damper 904) can be determined (e.g., by a control signal determination component 108).

At 1404, a rate of change from a current damping coefficient of the vehicle damper to a new damping coefficient based on the movement signal (e.g., determined by a damper sensor 112) of the vehicle damper can be determined (e.g., by a control signal determination component 108). At 1406, a level of damping can be adjusted, by the processor, from the current damping coefficient to the new damping coefficient at the rate of change.

Figure 15:
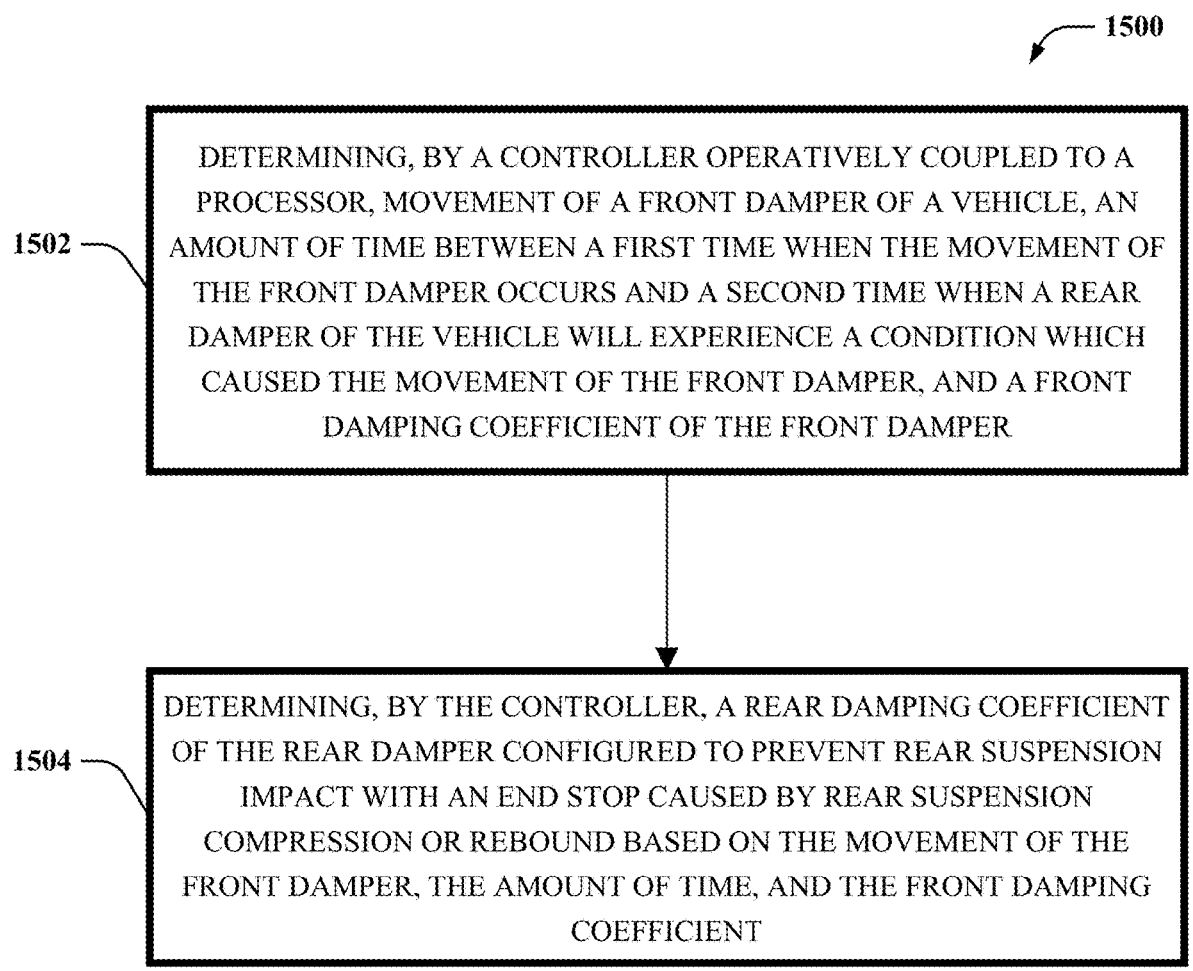
FIG. 15 illustrates a flow diagram of an example, non-limiting computer-implemented method that controls a vehicle damper in accordance with one or more embodiments described herein.

FIG. 15 illustrates a flow diagram of an example, non-limiting computer-implemented method 1500 that can adjust a rear damping coefficient in accordance with one or more embodiments described herein. Repetitive description of like elements and/or processes employed in respective embodiments is omitted for sake of brevity.

At 1502, movement of a front damper of a vehicle, an amount of time between a first time when the movement of the front damper occurs and a second time when a rear damper of the vehicle will experience a condition which caused the movement of the front damper, and a front damping coefficient of the front damper can be determined by a controller operatively coupled to a processor.

At 1504, the computer-implemented method 1500 can comprise determining, by the controller, a rear damping coefficient of the rear damper configured to prevent rear suspension impact with an end stop caused by rear suspension compression or rebound based on the movement of the front damper, the amount of time, and the front damping coefficient.

Figure 16:
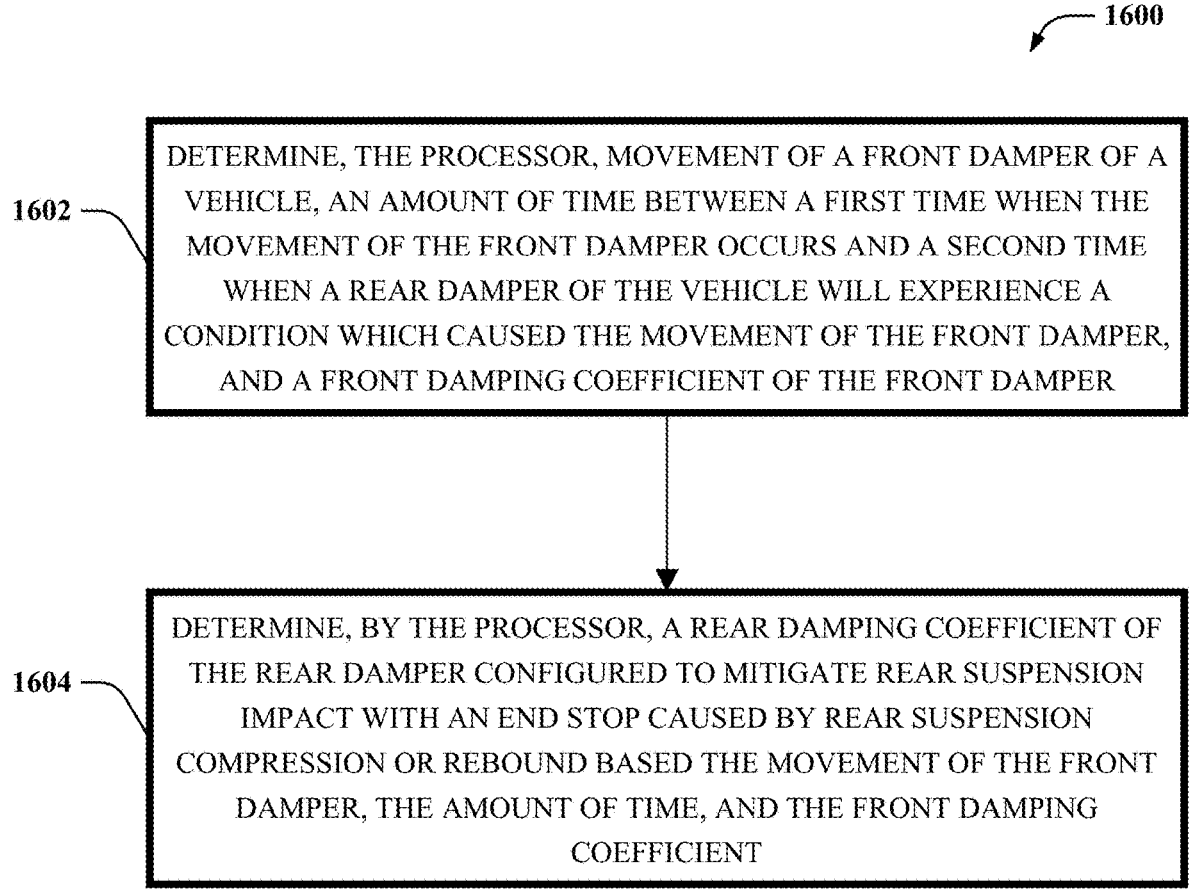
FIG. 16 illustrates a flow diagram of an example, computer program product that can cause a processor to control a vehicle damper in accordance with one or more embodiments described herein.

FIG. 16 illustrates a flow diagram of example, non-limiting program instructions 1600 that can facilitate rear damper adjustment in accordance with one or more embodiments described herein. Repetitive description of like elements and/or processes employed in respective embodiments is omitted for sake of brevity.

At 1602, movement of a front damper of a vehicle, an amount of time between a first time when the movement of the front damper occurs and a second time when a rear damper of the vehicle will experience a condition which caused the movement of the front damper, and a front damping coefficient of the front damper is determined by a processor.

At 1604 a rear damping coefficient of the rear damper is determined by the processor and is configured to mitigate rear suspension impact with an end stop caused by rear suspension compression or rebound based on the movement of the front damper, the amount of time, and the front damping coefficient.

Systems described herein can be coupled (e.g., communicatively, electrically, operatively, optically, etc.) to one or more local or remote (e.g., external) systems, sources, and/or devices (e.g., electronic control systems (ECU), classical and/or quantum computing devices, communication devices, etc.). For example, system 102 (or other systems, controllers, processors, etc.) can be coupled (e.g., communicatively, electrically, operatively, optically, etc.) to one or more local or remote (e.g., external) systems, sources, and/or devices using a data cable (e.g., High-Definition Multimedia Interface (HDMI), recommended standard (RS), Ethernet cable, etc.) and/or one or more wired networks described below.

In some embodiments, system herein can be coupled (e.g., communicatively, electrically, operatively, optically, etc.) to one or more local or remote (e.g., external) systems, sources, and/or devices (e.g., electronic control units (ECU), classical and/or quantum computing devices, communication devices, etc.) via a network. In these embodiments, such a network can comprise one or more wired and/or wireless networks, including, but not limited to, a cellular network, a wide area network (WAN) (e.g., the Internet), and/or a local area network (LAN). For example, system 102 can communicate with one or more local or remote (e.g., external) systems, sources, and/or devices, for instance, computing devices using such a network, which can comprise virtually any desired wired or wireless technology, including but not limited to: powerline ethernet, wireless fidelity (Wi-Fi), BLUETOOTH®, fiber optic communications, global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In this example, system 102 can thus include hardware (e.g., a central processing unit (CPU), a transceiver, a decoder, an antenna (e.g., a ultra-wideband (UWB) antenna, a BLUETOOTH® low energy (BLE) antenna, etc.), quantum hardware, a quantum processor, etc.), software (e.g., a set of threads, a set of processes, software in execution, quantum pulse schedule, quantum circuit, quantum gates, etc.), or a combination of hardware and software that facilitates communicating information between a system herein and remote (e.g., external) systems, sources, and/or devices (e.g., computing and/or communication devices such as, for instance, a smart phone, a smart watch, wireless earbuds, etc.).

System herein can comprise one or more computer and/or machine readable, writable, and/or executable components and/or instructions that, when executed by processor (e.g., a processor 106 which can comprise a classical processor, a quantum processor, etc.), can facilitate performance of operations defined by such component(s) and/or instruction(s). Further, in numerous embodiments, any component associated with a system herein, as described herein with or without reference to the various figures of the subject disclosure, can comprise one or more computer and/or machine readable, writable, and/or executable components and/or instructions that, when executed by a processor, can facilitate performance of operations defined by such component(s) and/or instruction(s). For example, control signal determination component 108, damper adjustment component 110, damper sensor 112, body movement sensor 204, temperature sensor 304, road condition component 404, user preference component 504, communication component 604, and/or artificial intelligence component 704 and/or any other components associated with systems as disclosed herein (e.g., communicatively, electronically, operatively, and/or optically coupled with and/or employed by a system described herein), can comprise such computer and/or machine readable, writable, and/or executable component(s) and/or instruction(s). Consequently, according to numerous embodiments, system herein and/or any components associated therewith as disclosed herein, can employ a processor (e.g., processor 106) to execute such computer and/or machine readable, writable, and/or executable component(s) and/or instruction(s) to facilitate performance of one or more operations described herein with reference to system herein and/or any such components associated therewith.

Systems herein can comprise any type of system, device, machine, apparatus, component, and/or instrument that comprises a processor and/or that can communicate with one or more local or remote electronic systems and/or one or more local or remote devices via a wired and/or wireless network. All such embodiments are envisioned. For example, a system (e.g., a system 702 or any other system or controller described herein) can comprise a computing device, a general-purpose computer, a special-purpose computer, an onboard computing device, a communication device, an onboard communication device, a server device, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Figure 17:
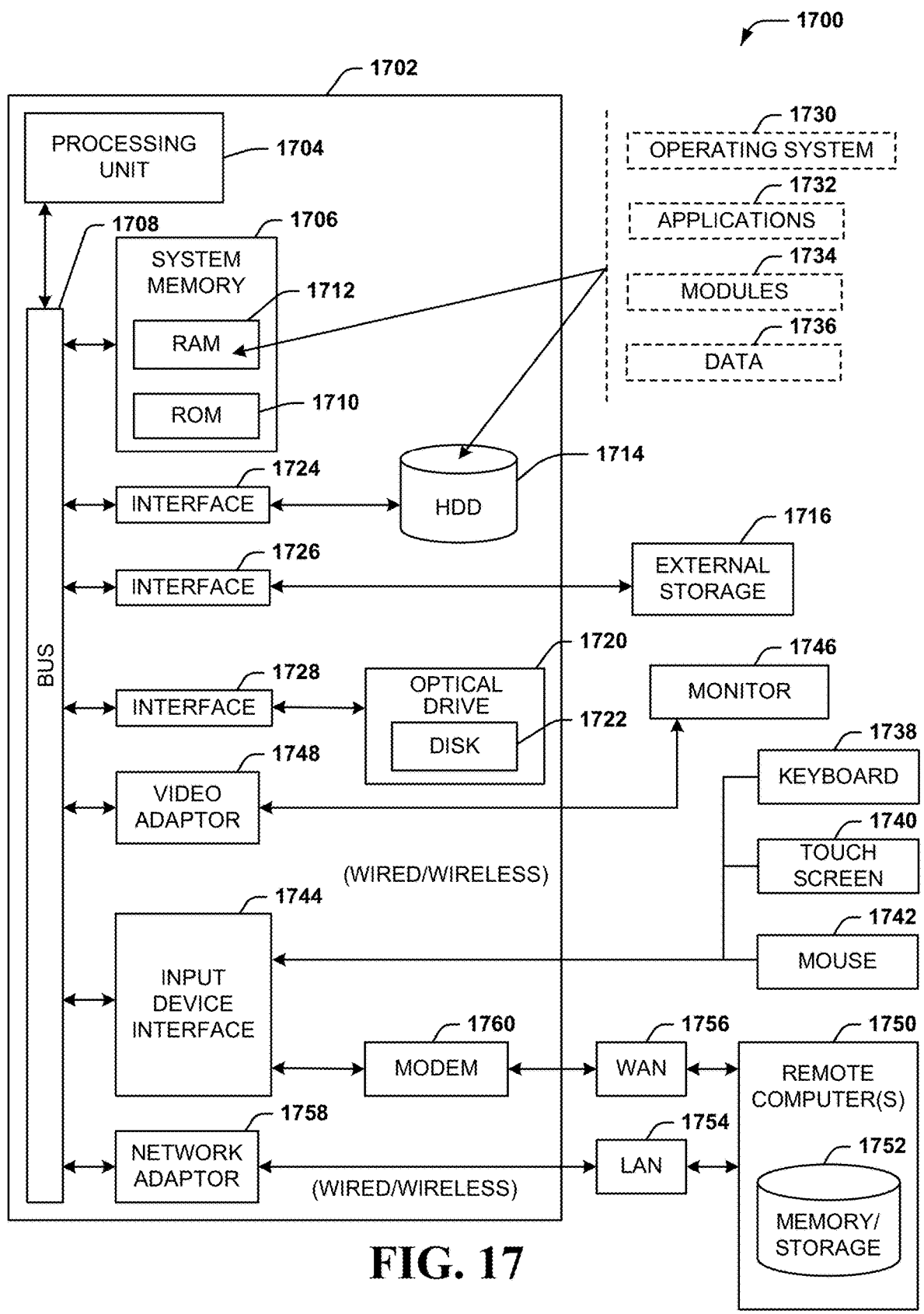
FIG. 17 is an example, non-limiting computing environment in which one or more embodiments described herein can be implemented.

In order to provide additional context for various embodiments described herein, FIG. 17 and the following discussion are intended to provide a brief, general description of a suitable computing environment 1700 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 17, the example environment 1700 for implementing various embodiments of the aspects described herein includes a computer 1702, the computer 1702 including a processing unit 1704, a system memory 1706 and a system bus 1708. The system bus 1708 couples system components including, but not limited to, the system memory 1706 to the processing unit 1704. The processing unit 1704 can be any of various commercially available processors. Dual microprocessors and other multi-processor architectures can also be employed as the processing unit 1704.

The system bus 1708 can be any of several types of bus structure that can further interconnect to a memory bus (with or without a memory controller), a peripheral bus, and a local bus using any of a variety of commercially available bus architectures. The system memory 1706 includes ROM 1710 and RAM 1712. A basic input/output system (BIOS) can be stored in a non-volatile memory such as ROM, erasable programmable read only memory (EPROM), EEPROM, which BIOS contains the basic routines that help to transfer information between elements within the computer 1702, such as during startup. The RAM 1712 can also include a high-speed RAM such as static RAM for caching data.

The computer 1702 further includes an internal hard disk drive (HDD) 1714 (e.g., EIDE, SATA), one or more external storage devices 1716 (e.g., a magnetic floppy disk drive (FDD) 1716, a memory stick or flash drive reader, a memory card reader, etc.) and an optical disk drive 1720 (e.g., which can read or write from a CD-ROM disc, a DVD, a BD, etc.). While the internal HDD 1714 is illustrated as located within the computer 1702, the internal HDD 1714 can also be configured for external use in a suitable chassis (not shown). Additionally, while not shown in environment 1700, a solid-state drive (SSD) could be used in addition to, or in place of, an HDD 1714. The HDD 1714, external storage device(s) 1716 and optical disk drive 1720 can be connected to the system bus 1708 by an HDD interface 1724, an external storage interface 1726 and an optical drive interface 1728, respectively. The interface 1724 for external drive implementations can include at least one or both of Universal Serial Bus (USB) and Institute of Electrical and Electronics Engineers (IEEE) 1794 interface technologies. Other external drive connection technologies are within contemplation of the embodiments described herein.

The drives and their associated computer-readable storage media provide nonvolatile storage of data, data structures, computer-executable instructions, and so forth. For the computer 1702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1712, including an operating system 1730, one or more application programs 1732, other program modules 1734 and program data 1736. All or portions of the operating system, applications, modules, and/or data can also be cached in the RAM 1712. The systems and methods described herein can be implemented utilizing various commercially available operating systems or combinations of operating systems.

Computer 1702 can optionally comprise emulation technologies. For example, a hypervisor (not shown) or other intermediary can emulate a hardware environment for operating system 1730, and the emulated hardware can optionally be different from the hardware illustrated in FIG. 17. In such an embodiment, operating system 1730 can comprise one virtual machine (VM) of multiple VMs hosted at computer 1702. Furthermore, operating system 1730 can provide runtime environments, such as the Java runtime environment or the .NET framework, for applications 1732. Runtime environments are consistent execution environments that allow applications 1732 to run on any operating system that includes the runtime environment. Similarly, operating system 1730 can support containers, and applications 1732 can be in the form of containers, which are lightweight, standalone, executable packages of software that include, e.g., code, runtime, system tools, system libraries and settings for an application.

Further, computer 1702 can be enable with a security module, such as a trusted processing module (TPM). For instance, with a TPM, boot components hash next in time boot components, and wait for a match of results to secured values, before loading a next boot component. This process can take place at any layer in the code execution stack of computer 1702, e.g., applied at the application execution level or at the operating system (OS) kernel level, thereby enabling security at any level of code execution.

A user can enter commands and information into the computer 1702 through one or more wired/wireless input devices, e.g., a keyboard 1738, a touch screen 1740, and a pointing device, such as a mouse 1742. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1704 through an input device interface 1744 that can be coupled to the system bus 1708, but can be connected by other interfaces, such as a parallel port, an IEEE 1394 serial port, a game port, a USB port, an IR interface, a BLUETOOTH® interface, etc.

A monitor 1746 or other type of display device can be also connected to the system bus 1708 via an interface, such as a video adapter 1748. In addition to the monitor 1746, a computer typically includes other peripheral output devices (not shown), such as speakers, printers, etc.

The computer 1702 can operate in a networked environment using logical connections via wired and/or wireless communications to one or more remote computers, such as a remote computer(s) 1750. The remote computer(s) 1750 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1752 is illustrated. The logical connections depicted include wired/wireless connectivity to a local area network (LAN) 1754 and/or larger networks, e.g., a wide area network (WAN) 1756. Such LAN and WAN networking environments are commonplace in offices and companies, and facilitate enterprise-wide computer networks, such as intranets, all of which can connect to a global communications network, e.g., the Internet.

When used in a LAN networking environment, the computer 1702 can be connected to the local network 1754 through a wired and/or wireless communication network interface or adapter 1758. The adapter 1758 can facilitate wired or wireless communication to the LAN 1754, which can also include a wireless access point (AP) disposed thereon for communicating with the adapter 1758 in a wireless mode.

When used in a WAN networking environment, the computer 1702 can include a modem 1760 or can be connected to a communications server on the WAN 1756 via other means for establishing communications over the WAN 1756, such as by way of the Internet. The modem 1760, which can be internal or external and a wired or wireless device, can be connected to the system bus 1708 via the input device interface 1744. In a networked environment, program modules depicted relative to the computer 1702 or portions thereof, can be stored in the remote memory/storage device 1752. It will be appreciated that the network connections shown are example and other means of establishing a communications link between the computers can be used.

When used in either a LAN or WAN networking environment, the computer 1702 can access cloud storage systems or other network-based storage systems in addition to, or in place of, external storage devices 1716 as described above. Generally, a connection between the computer 1702 and a cloud storage system can be established over a LAN 1754 or WAN 1756 e.g., by the adapter 1758 or modem 1760, respectively. Upon connecting the computer 1702 to an associated cloud storage system, the external storage interface 1726 can, with the aid of the adapter 1758 and/or modem 1760, manage storage provided by the cloud storage system as it would other types of external storage. For instance, the external storage interface 1726 can be configured to provide access to cloud storage sources as if those sources were physically connected to the computer 1702.

The computer 1702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 18:
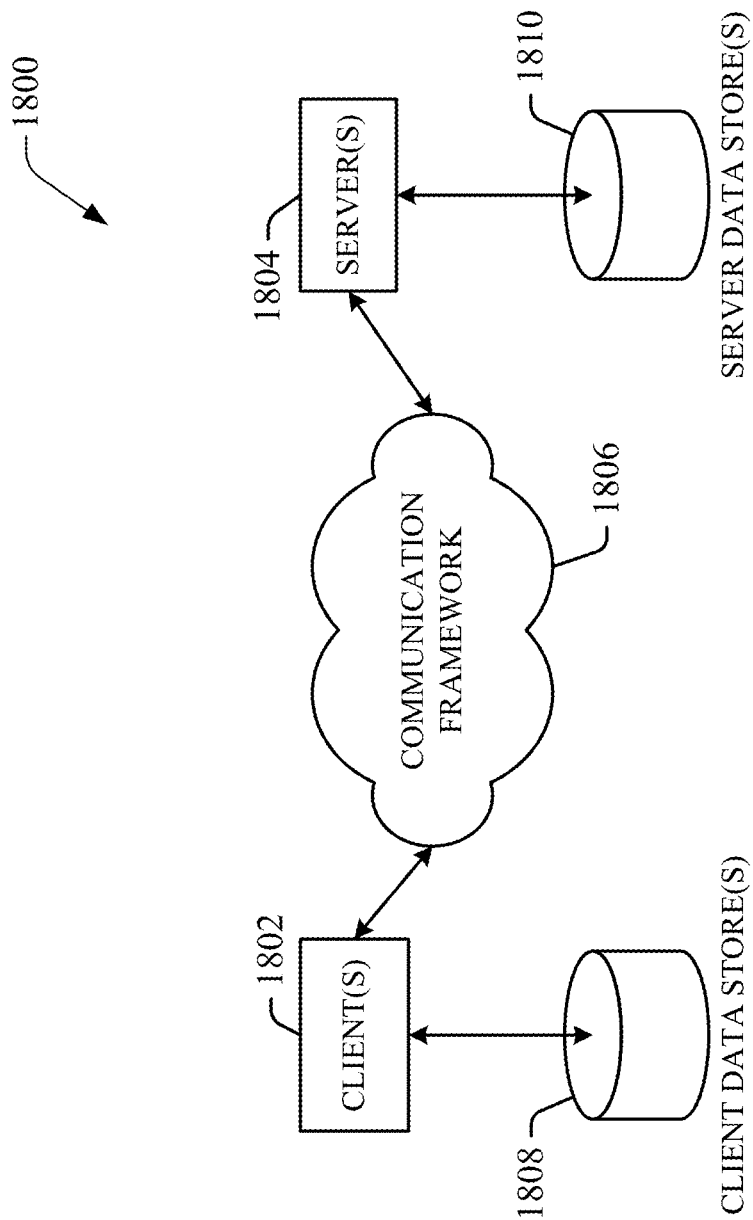
FIG. 18 is an example, non-limiting networking environment in which one or more embodiments described herein can be implemented.

Referring now to FIG. 18, there is illustrated a schematic block diagram of a computing environment 1800 in accordance with this specification. The system 1800 includes one or more client(s) 1802, (e.g., computers, smart phones, tablets, cameras, PDA's). The client(s) 1802 can be hardware and/or software (e.g., threads, processes, computing devices). The client(s) 1802 can house cookie(s) and/or associated contextual information by employing the specification, for example.

The system 1800 also includes one or more server(s) 1804. The server(s) 1804 can also be hardware or hardware in combination with software (e.g., threads, processes, computing devices). The servers 1804 can house threads to perform transformations of media items by employing aspects of this disclosure, for example. One possible communication between a client 1802 and a server 1804 can be in the form of a data packet adapted to be transmitted between two or more computer processes wherein data packets can include coded analyzed headspaces and/or input. The data packet can include a cookie and/or associated contextual information, for example. The system 1800 includes a communication framework 1806 (e.g., a global communication network such as the Internet) that can be employed to facilitate communications between the client(s) 1802 and the server(s) 1804.

Communications can be facilitated via a wired (including optical fiber) and/or wireless technology. The client(s) 1802 are operatively connected to one or more client data store(s) 1808 that can be employed to store information local to the client(s) 1802 (e.g., cookie(s) and/or associated contextual information). Similarly, the server(s) 1804 are operatively connected to one or more server data store(s) 1810 that can be employed to store information local to the servers 1804.

In one exemplary implementation, a client 1802 can transfer an encoded file, (e.g., encoded media item), to server 1804. Server 1804 can store the file, decode the file, or transmit the file to another client 1802. It is to be appreciated, that a client 1802 can also transfer uncompressed file to a server 1804 and server 1804 can compress the file and/or transform the file in accordance with this disclosure. Likewise, server 1804 can encode information and transmit the information via communication framework 1806 to one or more clients 1802.

The illustrated aspects of the disclosure can also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature can be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A computer-implemented method, comprising:
    determining, by a controller operatively coupled to a processor, movement of a front damper of a vehicle, an amount of time between a first time when the movement of the front damper occurs and a second time when a rear damper of the vehicle will experience a condition which caused the movement of the front damper, and a front damping coefficient of the front damper;
    determining, by the controller, a rear damping coefficient of the rear damper configured to prevent rear suspension impact with an end stop caused by rear suspension compression or rebound based on the movement of the front damper, the amount of time, and the front damping coefficient;
    determining, by the controller, a rate of change limit for changes to the rear damping coefficient to limit a jerk to a defined jerk limit based on a type of actuator associated with the rear damper; and
    changing, by the controller, the rear damping coefficient at or below the rate of change limit.

2. The computer-implemented method of claim 1, further comprising:
    sending, by the controller, a damper adjustment signal to the rear damper, wherein the damper adjustment signal comprises the rear damping coefficient.

3. The computer-implemented method of claim 1, further comprising:
   accessing, by the controller, road condition information determined by a second vehicle operatively coupled to the vehicle, and wherein the controller further determines the rear damping coefficient based on the road condition information.

4. The computer-implemented method of claim 1, further comprising:
   preventing, by the controller, a full compression or rebound of the rear damper, wherein the preventing is facilitated using the rear damping coefficient.

5. The computer-implemented method of claim 1, further comprising:
   determining, by the controller, movement of an occupant of the vehicle, wherein the rear damping coefficient is further based on the movement of the occupant.

6. The computer-implemented method of claim 1, further comprising:
   learning, by the controller and using artificial intelligence, to determine the rear damping coefficient based on the movement of the front damper, the amount of time between the first time and the second time and learns to determine the rear damping coefficient of the rear damper based on the movement of the front damper and the amount of time, and the front damping coefficient.

7. A system, comprising:
   a memory that stores computer executable components; and
   a processor that executes the computer executable components stored in the memory, wherein the computer executable components comprise:
   a control signal determination component that:
      determines movement of a front damper of a vehicle, an amount of time between a first time when the movement of the front damper occurs and a second time when a rear damper of the vehicle will experience a condition which caused the movement of the front damper, and a front damping coefficient of the front damper;
      determines a rear damping coefficient of the rear damper configured to mitigate rear suspension impact with an end stop caused by rear suspension compression or rebound based on the movement of the front damper, the amount of time, and the front damping coefficient; and
      determines a rate of change limit for changes to the rear damping coefficient to limit a jerk to a defined jerk limit associated with vehicle model of the vehicle from a group of defined jerk limits respectively associated with different vehicle models; and
   a damper adjustment component that adjusts the rear damper to the rear damping coefficient, wherein the damper adjustment component adjusts the rear damping coefficient at or below the rate of change limit.

8. The system of claim 7, wherein the computer executable components further comprise:
   a communication component that accesses road condition information determined by a second vehicle operatively coupled to the vehicle, and wherein the control signal determination component further determines the rear damping coefficient based on the road condition information.

9. The system of claim 7, wherein the control signal determination component prevents a full compression or rebound of the rear damper, wherein the preventing is facilitated using the rear damping coefficient.

10. The system of claim 7, wherein the computer executable components further comprise:
    a body movement sensor that measures movement of an occupant of the vehicle, and wherein the control signal determination component further determines the rear damping coefficient based on the movement of the occupant.

11. The system of claim 7, wherein the computer executable components further comprise:
    an artificial intelligence component that learns to determine the rear damping coefficient based on the movement of the front damper, the amount of time between the first time and the second time and learns to determine the rear damping coefficient of the rear damper based on the movement of the front damper and the amount of time, and the front damping coefficient.

12. A computer program product facilitating damper control, the computer program product comprising a non-transitory computer storage medium having program instructions embodied therewith, the program instructions executable by a processor to cause the processor to:
    determine, the processor, movement of a front damper of a vehicle, an amount of time between a first time when the movement of the front damper occurs and a second time when a rear damper of the vehicle will experience a condition which caused the movement of the front damper, and a front damping coefficient of the front damper;
    determine, by the processor, a rear damping coefficient of the rear damper configured to mitigate rear suspension impact with an end stop caused by rear suspension compression or rebound based on the movement of the front damper, the amount of time, and the front damping coefficient;
    determine, by the processor, a rate of change limit for changes to the rear damping coefficient to limit a jerk to a defined jerk limit based on a real-time estimation of respective static vertical load at corners of the vehicle; and
    changing, by the processor, the rear damping coefficient at or below the rate of change limit.

13. The computer program product of claim 12, wherein the program instructions are further executable by the processor to cause the processor to:
    send, by the processor, a damper adjustment signal to the rear damper, wherein the damper adjustment signal comprises the rear damping coefficient.

14. The computer program product of claim 12, wherein the program instructions are further executable by the processor to cause the processor to:
    access, by the processor, road condition information determined by a second vehicle operatively coupled to the vehicle, and wherein the processor further determines the rear damping coefficient based on the road condition information.

15. The computer program product of claim 12, wherein the program instructions are further executable by the processor to cause the processor to:
    prevent, by the processor, a full compression or extension of the rear damper using the rear damping coefficient.

16. The computer program product of claim 12, wherein the program instructions are further executable by the processor to cause the processor to:
    determine, by the processor, movement of an occupant of the vehicle, wherein the rear damping coefficient is further based on the movement of the occupant.

17. The computer program product of claim 12, wherein the program instructions are further executable by the processor to cause the processor to:
- learn, by the processor and using artificial intelligence, to determine the rear damping coefficient based on the movement of the front damper, the amount of time between the first time and the second time and learns to determine the rear damping coefficient of the rear damper based on the movement of the front damper and the amount of time, and the front damping coefficient.

18. The computer program product of claim 12, wherein the program instructions are further executable by the processor to cause the processor to:
- determine, by the processor, the defined jerk limit further based on a driving mode of the vehicle.

19. The system of claim 7, wherein the control signal determination component determines the defined jerk limit further based on a driving mode of the vehicle.

20. The computer-implemented method of claim 1, further comprising determining, by the controller, the defined jerk limit based on a driving mode of the vehicle.

\* \* \* \* \*